(12) United States Patent
Miyadera et al.

(10) Patent No.: US 8,395,648 B2
(45) Date of Patent: Mar. 12, 2013

(54) OPTICAL WRITER, IMAGE FORMING APPARATUS, AND METHOD OF CONTROLLING OPTICAL WRITER

(75) Inventors: Tatsuya Miyadera, Osaka (JP); Masayuki Hayashi, Osaka (JP); Yoshinori Shirasaki, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 186 days.

(21) Appl. No.: 13/046,893

(22) Filed: Mar. 14, 2011

(65) Prior Publication Data
US 2011/0228029 A1   Sep. 22, 2011

(30) Foreign Application Priority Data
Mar. 16, 2010 (JP) ................. 2010-059563

(51) Int. Cl.
*B41J 2/435* (2006.01)
*B41J 2/47* (2006.01)
(52) U.S. Cl. ......... 347/237; 347/234; 347/247; 347/249
(58) Field of Classification Search .......... 347/234, 347/237, 247, 249
See application file for complete search history.

(56) References Cited

U.S. PATENT DOCUMENTS

| | | | | |
|---|---|---|---|---|
| 4,935,891 A | * | 6/1990 | Curry | 708/276 |
| 6,317,246 B1 | * | 11/2001 | Hayashi et al. | 359/204.1 |
| 6,498,617 B1 | * | 12/2002 | Ishida et al. | 347/252 |
| 7,271,824 B2 | | 9/2007 | Omori et al. | |
| 7,518,628 B2 | * | 4/2009 | Shukuya | 347/249 |
| 8,005,321 B2 | * | 8/2011 | Omori et al. | 382/318 |
| 8,194,113 B2 | * | 6/2012 | Ozasa | 347/249 |
| 8,237,760 B2 | * | 8/2012 | Nihei et al. | 347/237 |
| 8,270,026 B2 | * | 9/2012 | Nihei et al. | 358/1.7 |
| 2007/0210245 A1 | * | 9/2007 | Maeda | 250/234 |

FOREIGN PATENT DOCUMENTS

| | | |
|---|---|---|
| JP | 2003-211723 | 7/2003 |
| JP | 2007-203739 | 8/2007 |

* cited by examiner

*Primary Examiner* — Laura Martin
*Assistant Examiner* — Jeremy Bishop
(74) *Attorney, Agent, or Firm* — IPUSA, PLLC

(57) ABSTRACT

An optical writer includes a scanning part causing a light beam from a light source to perform scanning on a photosensitive body; an image information obtaining part obtaining image information of an image; a dithering information obtaining part obtaining dithering information of the image; a pixel clock generating part generating a pixel clock signal; and a light emission control part to control the light source based on the image information in accordance with the pixel clock signal. The pixel clock generating part modulates the clock frequency of the pixel clock signal in accordance with phase shift information for correcting a change in the speed of the scanning on main scanning lines on the photosensitive body, and determines the timing of modulating the clock frequency based on the dithering information on a main scanning line basis so that the timing of modulating the clock frequency differs between the main scanning lines.

13 Claims, 25 Drawing Sheets

OPTICAL WRITER, IMAGE FORMING APPARATUS, AND METHOD OF CONTROLLING OPTICAL WRITER

CROSS-REFERENCE TO RELATED APPLICATION

The present application is based upon and claims the benefit of priority of the prior Japanese Patent Application No. 2010-059563, filed on Mar. 16, 2010, the entire contents of which are incorporated herein by reference.

BACKGROUND OF THE INVENTION

1. Field of the Invention

The present invention relates generally to an optical writer, an image forming apparatus, and a method of controlling the optical writer, and more particularly to phase correction of a pixel clock signal based on phase shift data.

2. Description of the Related Art

There is a recent trend toward promotion of digitized information, so that image processing apparatuses such as printers and facsimile machines used to output digitized information and scanners used to digitize documents are indispensable. These image processing apparatuses are often configured as multifunction peripherals usable as a printer, a facsimile machine, a scanner, and a copier by incorporating an image capturing function, an image forming function, and a communicating function.

In such image processing apparatuses, for those used to output digitized documents, electrophotographic image forming apparatuses are widely used. In the electrophotographic image forming apparatus, an electrostatic latent image is formed by exposing a photosensitive body to light, a toner image is formed by developing the electrostatic latent image using a developer such as toner, the toner image is transferred onto paper, and the paper is output.

In the electrophotographic image forming apparatus, an optical writer configured to expose the photosensitive body to light includes a light source configured to emit a beam to which the photosensitive body is exposed and a deflector for deflecting the emitted beam to scan the surface of the photosensitive body, such as a polygon scanner. In such an optical writer, a variation in the distance between the reflection surface and rotating shaft (axis of rotation) of the deflector causes a variation in the scanning speed of a light spot, which is the position of the beam emitted onto the scanned surface.

A description is given in detail of this variation in scanning speed. In common optical writers, an electrostatic latent image is written by exposing a photosensitive body to a light beam in accordance with a pixel clock signal. That is, the presence and the absence of light beam emission based on the presence or absence of color on a pixel basis are switched (determined) in accordance with a pixel clock signal. In principle, the frequency of this pixel clock signal is constant. Accordingly, the scanning speed of the light spot also is required to be constant on main scanning lines.

However, as long as the polygon scanner is used, it is natural for a variation to be caused in the distance between the reflection surface and rotating shaft (axis of rotation) of the deflector. Therefore, the above-described variation in speed is inevitable. That is, on a single main scanning line, the light spot moves fast in some parts and slow in other parts. Unless the variation in scanning speed is properly corrected, dot positions are caused to shift in the main scanning direction to cause fluctuation of an image, thus degrading image quality.

In order to correct this variation in scanning speed, the phase of the pixel clock signal on a scanning line is caused to shift in accordance with a variation caused in the scanning speed. Here, since a variation in the scanning speed is caused in each scanning line, the above-described phase shifting needs to be performed in each scanning line. However, if the scanning lines are subjected to phase shifting with the same timing, phase-shifted pixel clock pulses are successive in the sub scanning direction to produce an image with vertical streaks, thus degrading image quality.

In order to prevent the degradation of image quality due to this vertical-streak image, techniques are proposed to cause the start of correction to differ from scanning line to scanning line. (See, for example, Patent Documents 1 and 2 listed below.) According to the techniques disclosed in Patent Documents 1 and 2, the timing of the start of a correction due to phase shifting is randomized or is determined based on random numbers, thereby causing the timing of the start of the correction to differ from scanning line to scanning line to prevent generation of the vertical streaks.

[Patent Document 1] Japanese Laid-Open Patent Application No. 2007-203739

[Patent Document 2] Japanese Laid-Open Patent Application No. 2003-211723

SUMMARY OF THE INVENTION

According to an aspect of the present invention, an optical writer configured to form an electrostatic latent image on a photosensitive body by emitting a light beam onto the photosensitive body includes a light source configured to emit the light beam; a scanning part configured to guide the emitted light beam onto the photosensitive body and cause the light beam to perform scanning thereon; an image information obtaining part configured to obtain image information of an image to be formed as the electrostatic latent image; a dithering information obtaining part configured to obtain dithering information of dithering of the image; a pixel clock generating part configured to generate a pixel clock signal; and a light emission control part configured to control the light source based on the obtained image information in accordance with the generated pixel clock signal so as to cause the light source to emit the light beam, wherein the pixel clock generating part is configured to modulate a clock frequency of the pixel clock signal in accordance with phase shift information for correcting a change in a speed of the scanning by the light beam on main scanning lines on the photosensitive body, and to determine a timing of modulating the clock frequency based on the obtained dithering information on a main scanning line basis so that the timing of modulating the clock frequency differs between the main scanning lines.

According to an aspect of the present invention, an image forming apparatus includes the optical writer as set forth above.

According to an aspect of the present invention, a method of controlling an optical writer configured to form an electrostatic latent image on a photosensitive body by emitting a light beam onto the photosensitive body includes emitting the light beam from a light source; guiding the emitted light beam onto the photosensitive body and causing the light beam to perform scanning thereon with a scanning part; obtain image information of an image to be formed as the electrostatic latent image by an image information obtaining part; obtaining dithering information of dithering of the image by a dithering information obtaining part; generating a pixel clock signal by a pixel clock generating part; controlling the light source based on the obtained image information in accordance with the generated pixel clock signal so as to cause the light source to emit the light beam by a light emission control part; modulating, by the pixel clock generating part, a clock frequency of the pixel clock signal in accordance with phase shift information for correcting a change in a speed of the scanning by the light beam on main scanning lines on the photosensitive body; and determining, by the pixel clock generating part, a timing of modulating the clock frequency based on the obtained dithering information on a main scanning line basis so that the timing of modulating the clock frequency differs between the main scanning lines.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In digital circuits, it is virtually impossible to perform completely random control, and in the case of using the techniques disclosed in Patent Documents 1 and 2, phase-shifted pixel clock pulses have periodicity although not being successive in the sub scanning direction. Reducing this periodicity to perform control closer to random control results in an increase in the cost of a control circuit.

On the other hand, as described above, the phase-shifted pixel clock pulses do not cause vertical streaks. Further, the phase-shifted pixel clock pulses do not cause image degradation in a solid color image or an image without a rule, either, because the phase-shifted pixel clock pulses are scattered without being successive in the sub scanning direction. However, in the case of a dithered image, there occurs periodicity such as 2 by 2 or 3 by 3 in dot arrangement.

Depending on the relationship between the period of the dithered image and the period of the phase-shifted pixel clock pulses, moiré may occur. If moiré due to the phase-shifted pixel clock pulses occurs, the distribution density of the phase-shifted pixel clock pulses changes in units of tens of lines, which causes greater degradation of image quality than the above-described vertical streaks.

According to an aspect of the present invention, it is possible to prevent degradation of image quality at low cost in correcting a variation in scanning speed in optical writers.

A description is given below, with reference to the accompanying drawings, of embodiments of the present invention.

First Embodiment

In a first embodiment, a description is given, taking a multifunction peripheral (MFP) as an image forming apparatus as an example. The image forming apparatus according to this embodiment is an electrophotographic multifunction peripheral, and is configured to control a phase shifting mode based on phase shift data in an optical writer for forming an electrostatic latent image on a photosensitive body. The image forming apparatus may be other than a multifunction peripheral, such as a copier, a printer, or a facsimile machine.

Figure 1:
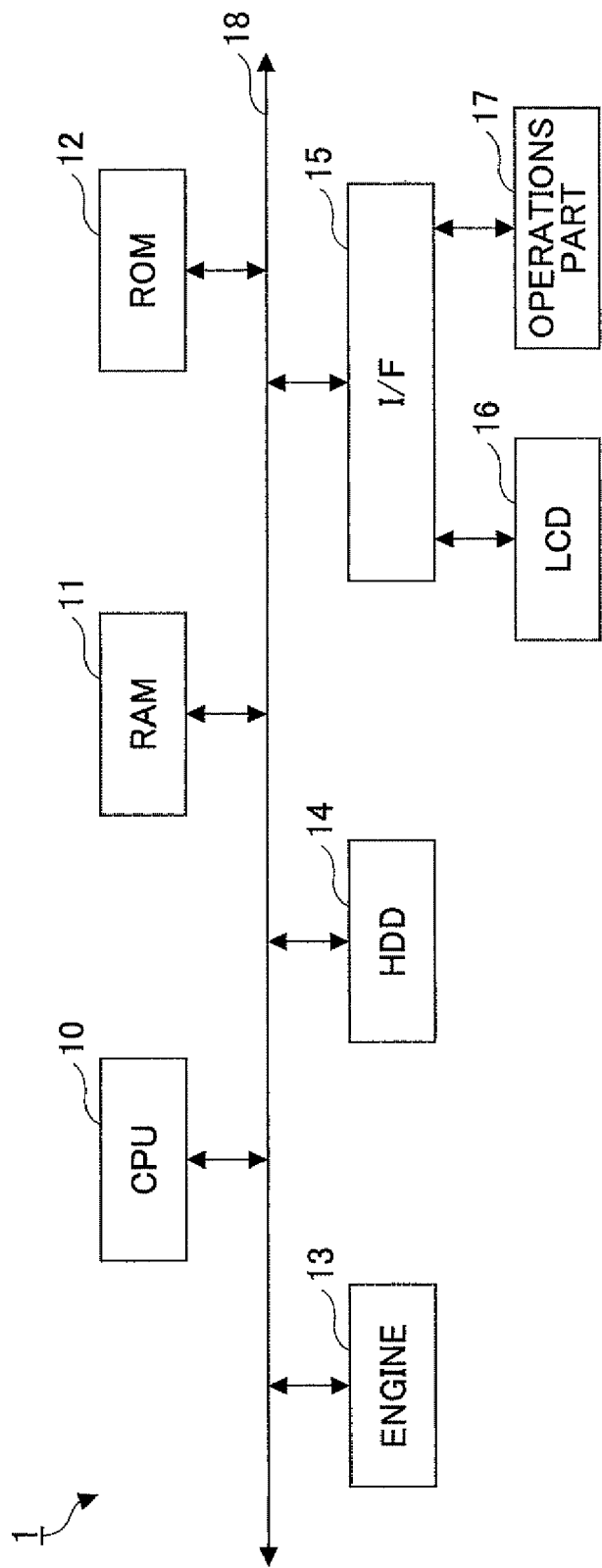
FIG. 1 is a block diagram illustrating a hardware configuration of an image forming apparatus according to a first embodiment of the present invention.

FIG. 1 is a block diagram illustrating a hardware configuration of an image forming apparatus 1 according to this embodiment.

Referring to FIG. 1, the image forming apparatus 1 according to this embodiment includes an engine configured to execute image formation in addition to the same configuration as that of an information processing terminal such as a common server or personal computer (PC).

That is, the image forming apparatus 1 according to this embodiment includes a central processing unit (CPU) 10, a random access memory (RAM) 11, a read-only memory (ROM) 12, an engine 13, a hard disk drive (HDD) 14, and an interface (I/F) 15, which are interconnected via a bus 18. Further, the image forming apparatus 1 includes a liquid crystal display (LCD) 16 and an operations part 17, which are connected to the I/F 15.

The CPU 10 is a processing unit (processor) and controls the operation of the entire image forming apparatus 1. The RAM 11 is a volatile storage medium that allows high-speed information reading and writing, and is used as a work area when the CPU 10 processes information. The ROM 12 is a nonvolatile storage medium dedicated to reading, and contains programs such as firmware. The engine 13 is a mechanism configured to actually form images in the image forming apparatus 1.

The HDD 14 is a nonvolatile storage medium that allows information reading and writing, and contains an operating system (OS) and various control programs and application programs. The I/F 15 connects and controls various hardware items and a network. The LCD 16 is a visual user interface for a user to check the condition of the image forming apparatus 1. The operations part 17, which includes a keyboard and a mouse, is a user interface for a user to input information to the image forming apparatus 1.

According to this hardware configuration, a program stored in the ROM 12, the HDD 14, or a recording medium such as an optical disk (not graphically illustrated) is read into the RAM 11 and executed by the CPU 10 to cause operations to be performed in accordance with the control of the CPU 10, thereby implementing a software control part. A functional block implementing the functions of the image forming apparatus 1 according to this embodiment is implemented by combining the software control part thus implemented and hardware.

Figure 2:
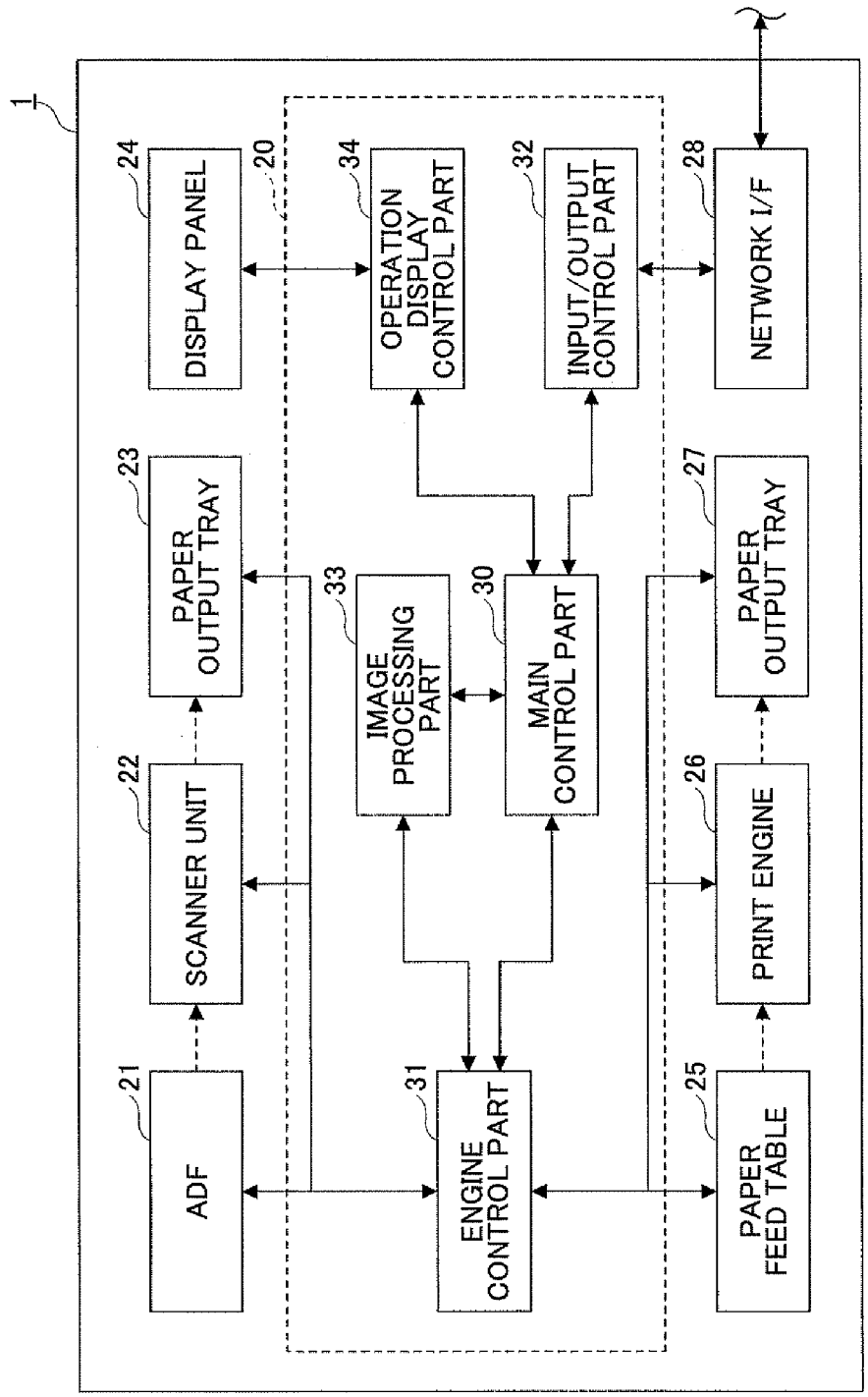
FIG. 2 is a block diagram illustrating a functional configuration of the image forming apparatus according to the first embodiment of the present invention.

Next, a description is given, with reference to FIG. 2, of a functional configuration of the image forming apparatus 1 according to this embodiment. FIG. 2 is a block diagram illustrating a functional configuration of the image forming apparatus 1 according to this embodiment.

Referring to FIG. 2, the image forming apparatus 1 according to this embodiment includes a controller 20, an automatic document feeder (ADF) 21, a scanner unit 22, a paper output tray 23, a display panel 24, a paper feed table 25, a print engine 26, a paper output tray 27, and a network I/F 28.

Further, the controller 20 includes a main control part 30, an engine control part 31, an input/output control part 32, an image processing part 33, and an operation display control part 34. As illustrated in FIG. 2, the image forming apparatus 1 according to this embodiment is configured as a multifunction peripheral including the scanner unit 22 and the print engine 26. In FIG. 2, electrical connections are indicated by solid arrows, and a paper flow is indicated by dashed arrows.

The display panel 24 is an output interface configured to visually display the condition of the image forming apparatus 1 and, as a touchscreen panel, is also an input interface (operations part) for a user to directly operate the image forming apparatus 1 or input information to the image forming apparatus 1. The network I/F 28 is an interface for the image forming apparatus 1 to communicate with other apparatuses via a network. An Ethernet (registered trademark) interface or a universal serial bus (USB) interface is used for the network I/F 28.

The controller 20 is implemented by a combination of software and hardware. For example, a control program such as firmware contained in a nonvolatile memory such as the ROM 12, the HDD 14, or a nonvolatile recording medium such as an optical disk is loaded into a volatile memory (hereinafter, "memory") such as the RAM 11, so that the controller 20 is implemented with the software control part implemented in accordance with the control of the CPU 10 and hardware including an integrated circuit. The controller 20 serves as a control part configured to control the entire image forming apparatus 1.

The main control part 30 is configured to control and issue commands to the respective parts of the controller 20. The engine control part 31 serves as a driving part configured to control or drive the print engine 26, the scanner unit 22, etc. The input/output control part 32 is configured to input, to the main control part 30, signals and commands input through the network I/F 28. Further, the main control part 30 is configured to control the input/output control part 32 and to access other apparatuses via the network I/F 28.

The image processing part 33 is configured to generate drawing information based on printing information included in an input print job in accordance with the control of the main control part 30. The drawing information is information for the print engine 26, which is an image forming part, to draw an image to be formed in an image forming operation. Further, the printing information included in the print job is image information converted into a format recognizable by the image forming apparatus 1 by a printer driver installed in an information processor such as a PC. The operation display control part 34 is configured to display information on the display panel 24 and to notify the main control part 30 of information input via the display panel 24.

In the case where the image forming apparatus 1 operates as a printer, first, the input/output control part 32 receives a print job via the network I/F 28. The input/output control part 32 transfers the received print job to the main control part 30. In response to reception of the print job, the main control part 30 controls the image processing part 33 to cause the image processing part 33 to generate drawing information based on the printing information included in the print job.

Once the drawing information is generated by the image processing part 33, the engine control part 31 forms an image on paper conveyed from the paper feed table 25 based on the generated drawing information. That is, the print engine 26 operates as an image forming part. The paper on which an image has been formed by the print engine 26 is output (discharged) onto the paper output tray 27.

In the case where the image forming apparatus 1 operates as a scanner, the operation display control part 34 or the input/output control part 32 transfers a scan execution signal to the main control part 30 in accordance with a user's operation of the display panel 24 or a scan execution command input via the network I/F 28 from an external PC, etc. The main control part 30 controls the engine control part 31 based on the received scan execution signal.

The engine control part 31 drives the ADF 21 to convey an original (such as a document) to be subjected to image capturing set in the ADF 21. Further, the engine control part 31 drives the scanner unit 22 to scan the original conveyed from the ADF 21 to capture an image. The scanned original is thereafter output (discharged) onto the paper output tray 23. If the original is not set in the ADF 21 but is set directly in the scanner unit 22, the scanner unit 22 scans the set original to capture an image in accordance with the control of the engine control part 31. That is, the scanner unit 22 operates as an image capturing part.

In the image capturing operation, an image capturing device included in the scanner unit 22, such as a charge-coupled device (COD), optically scans the original, and captured image information is generated based on optical information. The engine control part 31 transfers the captured image information generated by the scanner unit 22 to the image processing part 33. The image processing part 33 generates image information based on the captured image information received from the engine control part 31 in accordance with the control of the main control part 30. The image information generated by the image processing part 33 may be stored in a storage medium attached to or included in the image forming apparatus 1, such as the HDD 40. That is, the scanner unit 22, the engine control part 31, and the image processing part 33 operate in conjunction with one another to serve as an original (document) reading part.

The image information generated by the image processing part 33 is stored directly in the HDD 40, etc., or is transmitted to an external apparatus via the input/output control part 32 and the network I/F 28 in accordance with a user's instruction. That is, the ADF 21 and the engine control part 31 operate as an image inputting part.

In the case where the image forming apparatus 1 operates as a copier, the image processing part 33 generates drawing information based on the captured image information received from the scanner unit 22 by the engine control part 31 or the image information generated by the image processing part 33. The engine control part 31 drives the print engine 26 based on the drawing information the same as in the case of the printer operation.

Figure 3:
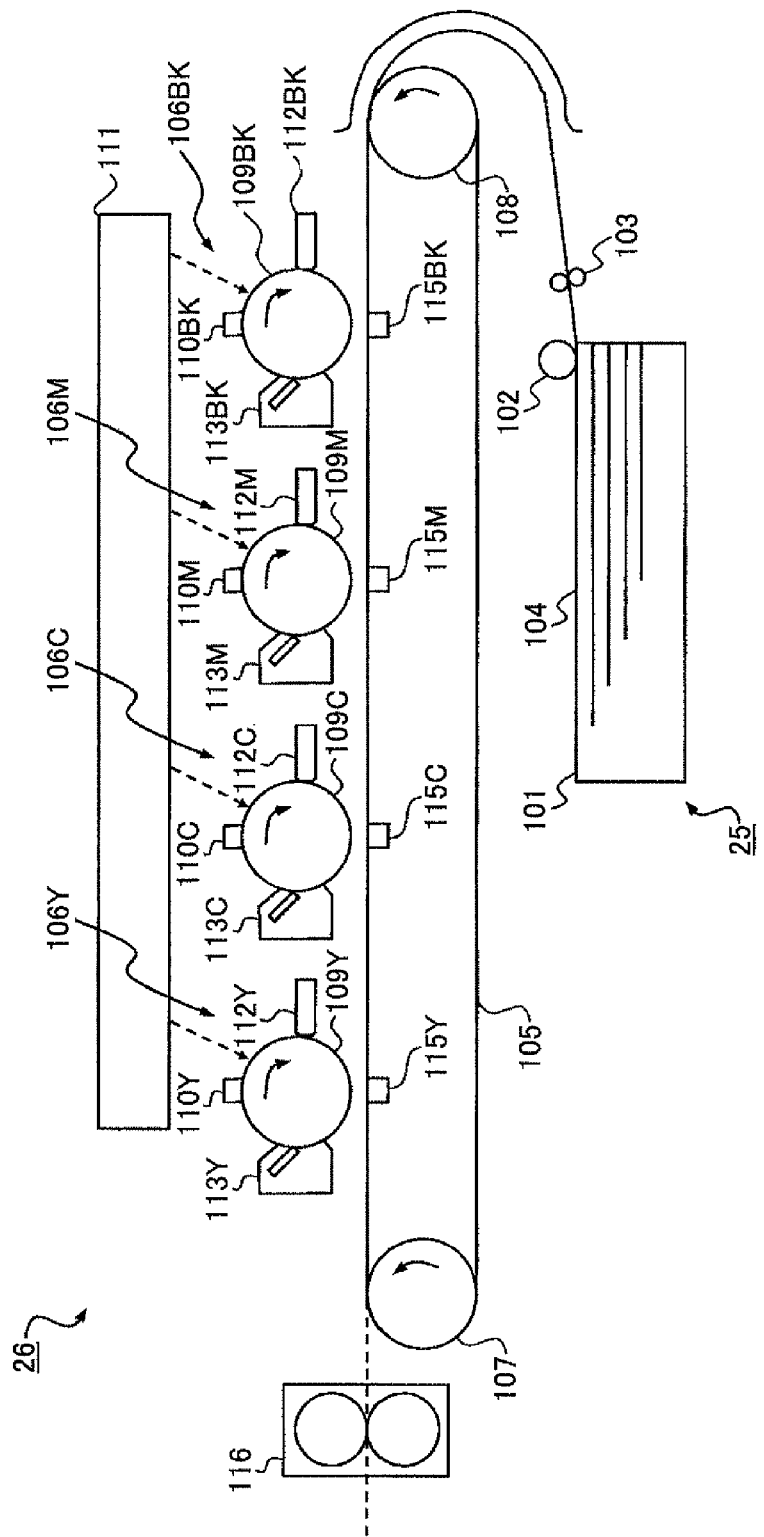
FIG. 3 is a diagram illustrating a configuration of a print engine according to the first embodiment of the present invention.

Next, a description is given, with reference to FIG. 3, of a configuration of the print engine 26 according to this embodiment.

Referring to FIG. 3, the print engine 26 according to this embodiment is a so-called tandem type, and includes a conveyor belt 105, which is an endless moving part, and multiple image forming parts (electrophotographic process parts) 106BK, 106M, 106C, and 106Y of respective colors arranged along the conveyor belt 105. That is, the image forming parts 106BK, 106M, 106C, and 106Y are arranged in this order from the upstream side in the conveying direction of the conveyor belt 105 along the conveyor belt 105, which conveys paper (or sheets of paper) 104 (an example recording medium) separated and fed from a paper feed tray 101 with a paper feed roller 102 and separating rollers 103.

These image forming parts 106BK, 106M, 106C, and 106Y are different only in the color of a toner image to form and have the same internal structure. The image forming parts 106BK, 106M, 106C, and 106Y form a black image, a magenta image, a cyan image, and a yellow image, respectively. In the following, a specific description is given of the image forming part 106BK, while the components of the other image forming apparatuses 106M, 106C, and 106Y, which are the same as those of the image forming apparatus 106BK, are only denoted in FIG. 3 by their respective reference numerals that replace "BK" of the corresponding components of the image forming apparatus 106BK with "M," "C," and "Y," respectively, and a description thereof is omitted.

The conveyor belt 105 is an endless belt looped around a drive roller 107 driven (powered) to rotate and a driven roller 108. The drive roller 107 is driven to rotate by a drive motor (not graphically illustrated). This drive motor, the drive roller 107, and the driven roller 108 serve as a driving part configured to move the conveyor belt 105, which is an endless moving part.

In forming an image, the sheets of paper 104 stored in the paper feed tray 101 are successively fed with the uppermost one fed first. Then, the fed paper 104 is caused to adhere to the conveyor belt 105 by electrostatic attraction to be conveyed to the first image forming part 106BK by the rotating conveyor belt 105, where a black toner image is transferred onto the paper 104. That is, the conveyor belt 105 serves as a conveying body configured to convey a recording medium (such as paper) onto which an image is to be transferred.

The image forming part 106BK includes a photosensitive body drum 109BK as a photosensitive body. The image forming part 106BK further includes a charger 110BK, an optical writer 111, a developing unit 112BK, a photosensitive body cleaner (not graphically illustrated), and a discharger 113BK, which are disposed around the photosensitive body drum 109BK. The optical writer 111 is configured to emit laser beams to the photosensitive body drums 109BK, 109M, 109C, and 109Y, respectively.

In forming an image, the peripheral surface of the photosensitive body drum 109BK is uniformly charged with the charger 110BK in a dark place, and thereafter, an electrostatic latent image is formed on the peripheral surface of the photosensitive body drum 109BK with a laser beam corresponding to a black image from the optical writer 111. The developing unit 112BK visualizes this electrostatic latent image with black toner, thereby forming a black toner image on the photosensitive body drum 109BK.

This toner image is transferred onto the paper 104 by the action of a transfer unit 115BK at a position (transfer position) where the photosensitive body drum 109BK and the paper 104 on the conveyor belt 105 come into contact. As a result of this transfer, the black toner image is formed on the paper 104. After completion of the transfer of the toner image, the photosensitive body drum 109BK has its peripheral surface cleaned of unnecessary residual toner with the photosensitive body cleaner, and is thereafter discharged with the discharger 113BK and waits for forming the next image.

The paper 104, on which the black toner image has thus been transferred in the image forming part 106BK, is conveyed to the next image forming part 106M by the conveyor belt 105. In the image forming part 106M, a magenta toner image is formed on the photosensitive body drum 109M and is transferred to be superposed on the black toner image formed on the paper 104 in the same image forming process as in the image forming part 106BK.

The paper 104 is further conveyed to the next image forming parts 106C and 106Y, and in the same operation, a cyan toner image formed on the photosensitive body drum 109C and a yellow toner image formed on the photosensitive body drum 109Y are transferred onto the paper 104 in a superposed manner. Thus, a full-color image is formed on the paper 104. The paper 104 on which this full-color composite image is formed is removed from the conveyor belt 105, and has the image fixed in a fixing unit 116. Thereafter, the paper 104 is output (discharged) outside the image forming apparatus 1.

Next, a description is given of the optical writer 111 according to this embodiment.

Figure 4:
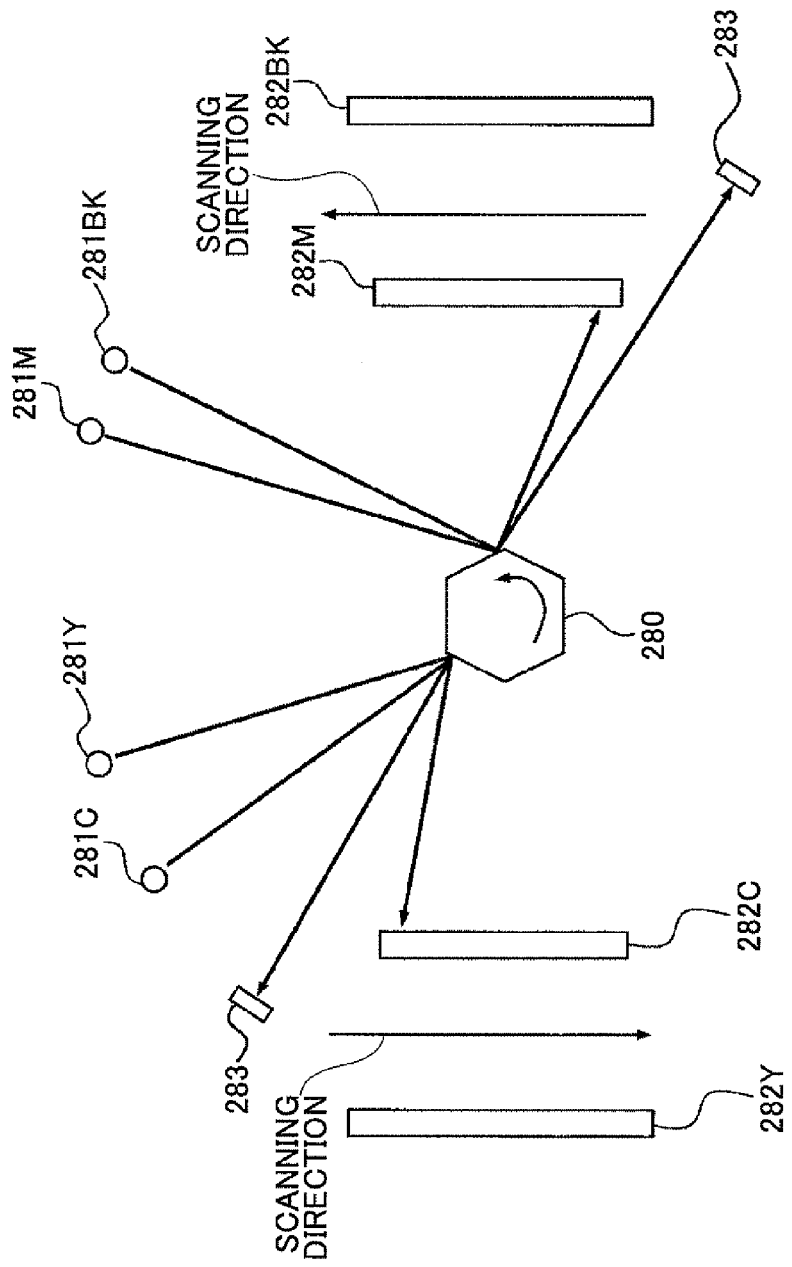
FIG. 4 is a plan view of an optical writer, illustrating a configuration thereof, according to the first embodiment of the present invention.

FIG. 4 is a plan view of the optical writer 111 according to this embodiment. Further, FIG. 5 is a cross-sectional side view of the optical writer 111 according to this embodiment.

Figure 5:
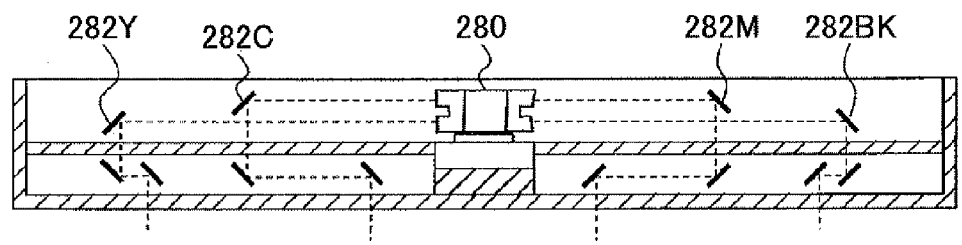
FIG. 5 is a cross-sectional side view of the optical writer according to the first embodiment of the present invention.

As illustrated in FIG. 4 and FIG. 5, laser beams for writing onto the photosensitive body drums 109BK, 109M, 109C, and 109Y of the respective colors are emitted from light source units 281BK, 281M, 281C, and 281Y (hereinafter collectively referred to as "light source units 281"), respectively, which are light sources. The light source units 281 according to this embodiment each include a semiconductor laser, a collimator lens, a slit, a prism, and a cylindrical lens.

The laser beams emitted from the light source units 281 are reflected by a reflecting mirror 280. The laser beams are guided to mirrors 282BK, 282M, 282C, and 282Y (hereinafter collectively referred to as "mirrors 282") by respective optical systems such as fθ lenses (not graphically illustrated), and are further directed by other optical systems provided ahead to the photosensitive body drums 109BK, 109M, 109C, and 109Y to scan their surfaces. That is, the reflecting mirror 280 and the mirrors 282 serve as a scanning part.

The reflecting mirror 280, which is a polygon mirror of a hexahedron, is configured to rotate to allow a laser beam to perform scanning for one line in the main scanning direction per polygon mirror surface. The optical writer 111 according to this embodiment divides the four light source units 281 into groups of two colors each, that is, the light source units 281BK and 281M and the light source units 281C and 281Y, and performs scanning using different reflecting surfaces of the reflecting mirror 280. This makes it possible to perform simultaneous writing onto the four different photosensitive body drums 109BK, 109M, 109C, and 109Y with a configuration more compact than a scanning system using only a single reflecting surface.

Further, horizontal synchronization detecting sensors 283 are provided near the scanning start positions of ranges (areas) that the laser beams are caused to scan by the reflecting mirror 280. The scanning start position of a main scanning line is temporally detected in response to the entrance of a laser beam emitted from the light source unit 281 into the corresponding horizontal synchronization detecting sensor 283, so that a control unit controlling the light source units 281 and the reflecting mirror 280 are synchronized.

In this optical writer 111, as described above, the laser beams are caused to perform scanning throughout in the main scanning direction by the rotation of the reflecting mirror 280. Since the reflecting mirror 280 is a hexahedron, each of the reflecting surfaces that reflect the laser beams is a plane (flat) surface. On the plane surface, the distance to the axis of rotation varies from part to part, and during scanning from one end to the other end of a main scanning line by the laser beam, the traveling speed of a light spot (hereinafter, "scanning speed"), which is the landing point of the laser beam on the scanned surface, varies. According to an aspect of the present invention, this variation in the scanning speed on the main scanning line is corrected. The variation in the scanning speed may be caused by the installation error or the manufacturing tolerance of the mirrors 282 as well in addition to a difference in optical length between the light beams.

Figure 6:
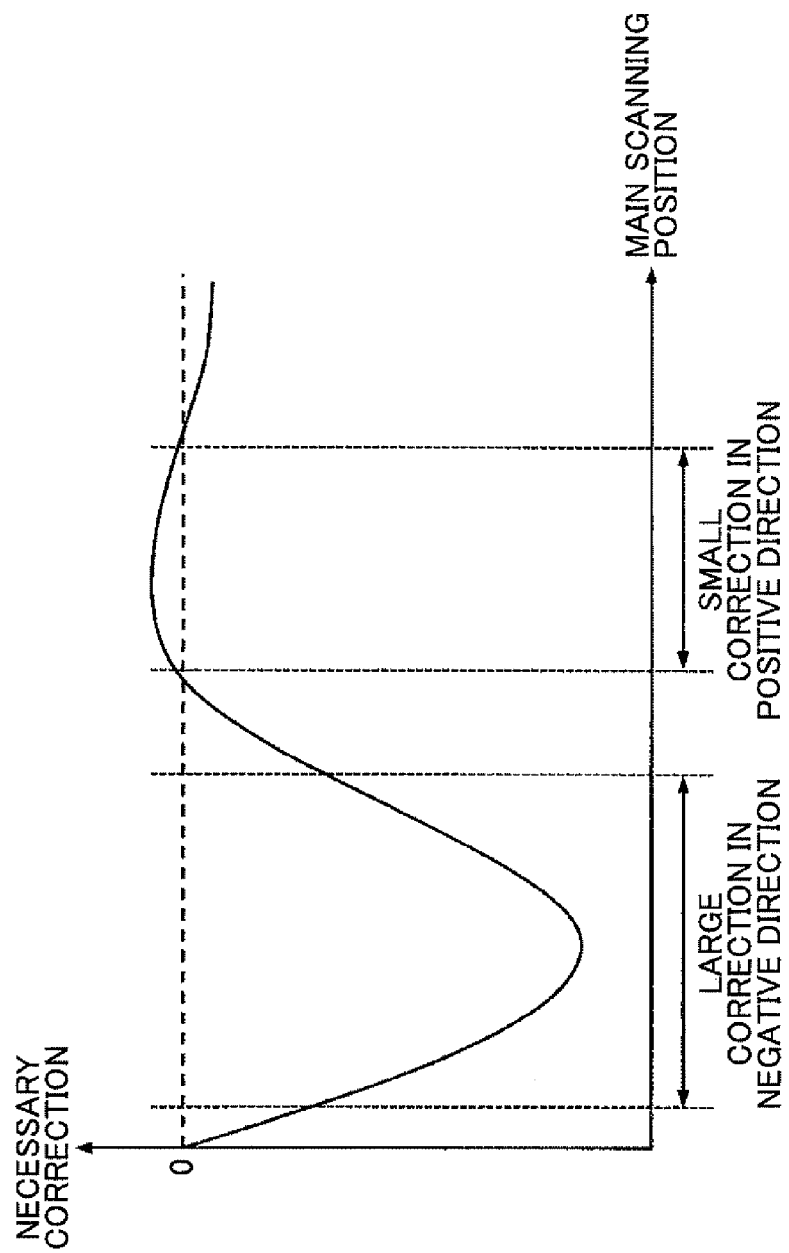
FIG. 6 is a graph illustrating a phase shift characteristic in the optical writer according to the first embodiment of the present invention.

A description is given, with reference to FIG. 6, of a problem caused by the above-described variation in the scanning speed. If the scanning speed is constant on a main scanning line, pixels are at regular intervals on the main scanning line as long as writing is performed based on a constant pixel clock signal. In the case of a varying scanning speed, however, if writing is performed based on a constant pixel clock signal, the interval between pixels is wide where the scanning speed is high, and is narrow where the scanning speed is low. Accordingly, it is necessary to correct the interval between pixels in accordance with a variation in the scanning speed.

FIG. 6 is a graph illustrating a necessary (amount of) correction according to a position on the main scanning line. In other words, information as illustrated in FIG. 6 is used as phase shift information for correcting the scanning speed to a substantially constant speed in the optical writer 111. As illustrated in FIG. 6, a variation in the scanning speed causes a variation in the necessary correction in accordance with a position on the main scanning line. The area of "a large correction in the negative direction" illustrated in FIG. 6 is where it is necessary to perform correction to narrow (reduce) the interval between pixels, that is, where the scanning speed is higher than a reference speed. Further, this area is where there is a large difference between the scanning speed and the reference speed because the amount of correction is large.

On the other hand, the area of "a small correction in the positive direction" illustrated in FIG. 6 is where it is necessary to perform correction to widen (increase) the interval between pixels, that is, where the scanning speed is lower than the reference speed. Further, this area is where the difference between the scanning speed and the reference speed is small because the amount of correction is small. According to this embodiment, the pixel interval is corrected to an appropriate interval by shifting the phase of a pixel clock signal, that is, the frequency of a pixel clock signal, based on such a correction characteristic. The necessary correction characteristic as illustrated in FIG. 6 differs depending on the configuration of an optical system in the optical writer 111.

Figure 7:
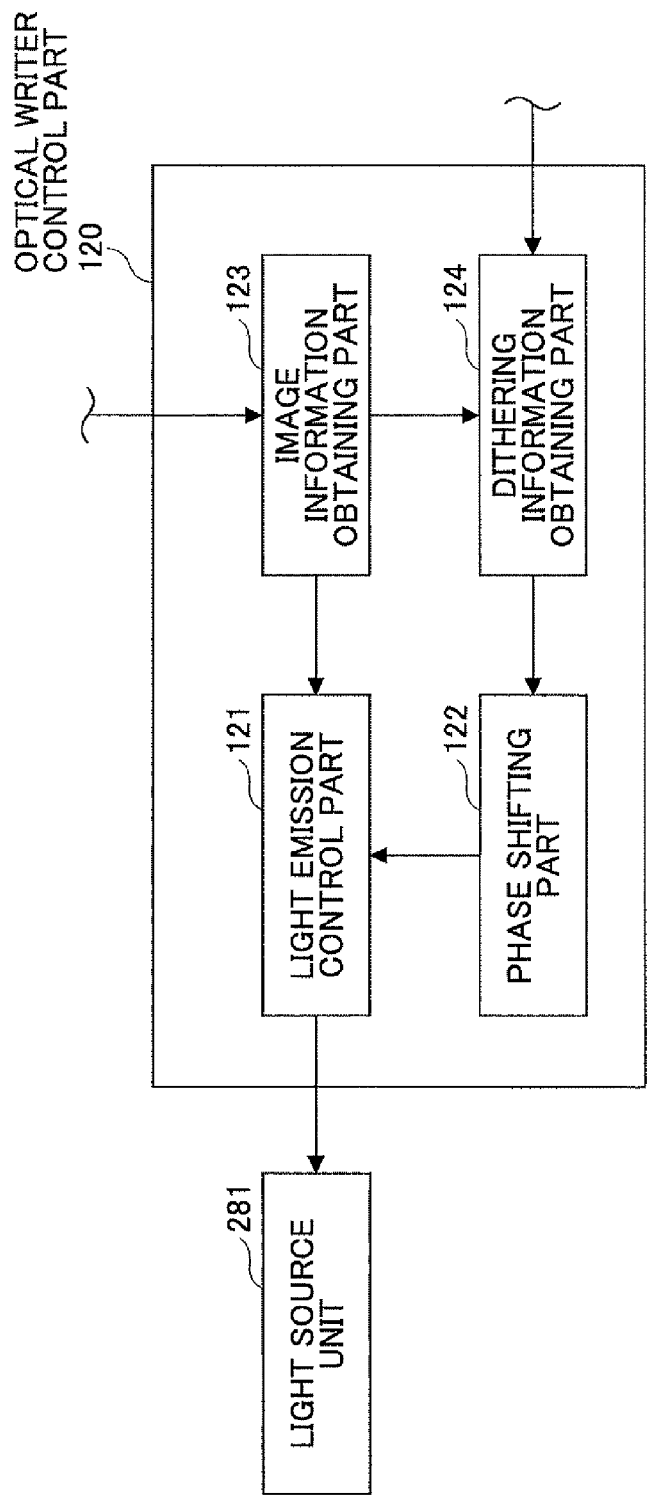
FIG. 7 is a block diagram illustrating a control part of the optical writer according to the first embodiment of the present invention.

Next, a description is given, with reference to FIG. 7, of a control block of the optical writer according to this embodiment. FIG. 7 is a diagram illustrating a functional configuration of an optical writer control part 120 configured to control the optical writer 111 according to this embodiment and a connection between the optical writer control part 120 and the light source units 281. As illustrated in FIG. 7, the optical writer control part 120 includes a light emission control part 121, a phase shifting part 122, an image information obtaining part 123, and a dithering information obtaining part 124.

The optical writer 111 according to this embodiment includes an information processing mechanism including a CPU, a RAM, a ROM, and an HDD (not graphically illustrated) like the CPU 10, the RAM 11, the ROM 12, and the HDD 14 described with reference to FIG. 1. Like the controller 20 of the image forming apparatus 1, the optical writer control part 120 according to this embodiment as illustrated in FIG. 7 has its functional block implemented by a combination of a software control part and hardware, the software control part being implemented by loading a control program stored in the ROM or the HDD into the RAM and causing operations to be performed in accordance with the control of the CPU.

The light emission control part 121 is a light source control part configured to control the light emission of the light source units 281 based on the image information input from the engine control part 31 of the controller 20 in accordance with the synchronization detecting signals generated by the horizontal synchronization detecting sensors 283. The light emission control part 121 is configured to control the turning ON/OFF of the light source units 281 on a pixel basis in accordance with a pixel clock signal.

The phase shifting part 122 is configured to generate a pixel clock signal whose phase is shifted in accordance with a position on a main scanning line based on the phase shift information as illustrated in FIG. 6 and the characteristic of dithering performed on an input image, and to input the generated "phase-shifted" pixel clock signal (pulse signal) to the light emission control part 121. That is, the phase shifting part 122 serves as a pixel clock generating part.

The image information obtaining part 123 is configured to obtain image information input from the controller 20 and input the obtained image information to the light emission control part 121. Further, the image information obtaining part 123 is configured to input the image information to the dithering information obtaining part 124 as well in order to obtain dithering information described below. The dithering information obtaining part 124 is configured to obtain information on the dithering performed on an image to be written, and to input the obtained dithering information to the phase shifting part 122.

The dithering information obtaining part 124 may obtain the dithering information by determining a dithering characteristic by referring to the image information input from the image information obtaining part 123. Alternatively, the dithering information obtaining part 124 may also obtain information indicating a dithering characteristic from the controller 20. In the case of obtain information indicating a dithering characteristic from the controller 20, information on a dithering characteristic itself may be obtained. Alternatively, the dithering information obtaining part 124 may contain a database containing information on dithering of various characteristics, and obtain identification information for identifying a dithering characteristic from the controller 20 and obtain a dithering characteristic corresponding to the identification information from the database.

Next, a description is given of a function of the phase shifting part 122 according to this embodiment.

Figure 8:
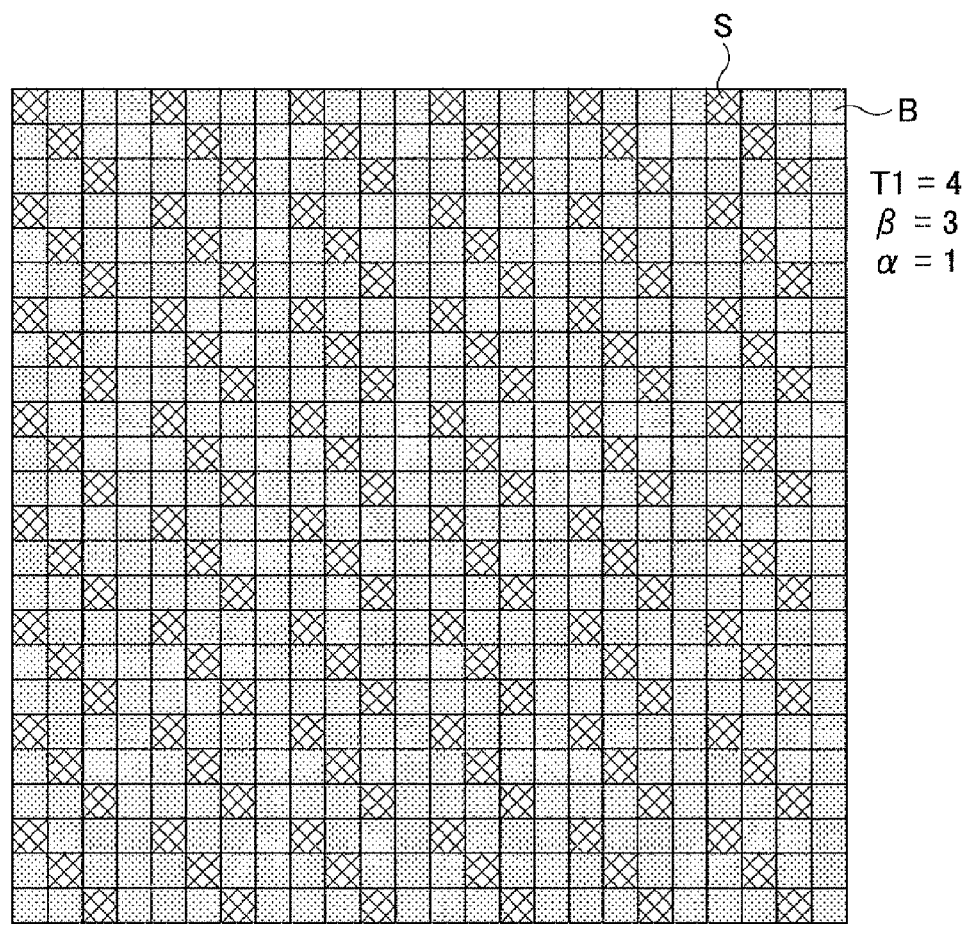
FIG. 8 is a diagram illustrating generation of moiré in phase shifting according to the first embodiment of the present invention.

FIG. 8 is a diagram illustrating an output image, which is a solid color image, subjected to phase shifting by the phase shifting part 122. In the output image illustrated in FIG. 8, a pixel region B is a pixel with ink that is not a target of phase shifting. Further, a pixel region S is a pixel with ink that is a target of phase shifting.

In the case illustrated in FIG. 8, a phase shift period in the main scanning direction, T1, is "4." That is, phase shifting is performed every four pixels. The phase shifting part 122 includes a pixel clock counter (not graphically illustrated), and counts pixel clock pulses when the light emission control part 121 controls the light emission of the light source units 281. Every time the count value of pixel clock pulses reaches the value of T1, the phase shifting part 122 modulates the phase of the pixel clock signal input to the light emission control part 121. This value of T1 is determined based on the phase shift characteristic described with reference to FIG. 6.

Because of the effect of a phase shift, the visual characteristic of a pixel differs between the "phase-shifted" pixel region S (subjected to phase shifting) and the pixel region B that is not subjected to phase shifting. Here, the visual characteristic that differs is basically image density. Accordingly, the phase shifting part 122 prevents "phase-shifted" pixels from being successive to form vertical streaks in the sub scanning direction by varying the initial value of the pixel clock counter from main scanning line to main scanning line. The amount of variation α of this initial value of the pixel clock counter for each main scanning line is "1" in FIG. 8. As a result, as illustrated in FIG. 8, the "phase-shifted" pixels are offset (shifted) by one pixel each on a main scanning line basis. It differs between modes of phase shifting how the visual characteristic differs between the pixel region S and the pixel region B.

As illustrated in FIG. 6, a correction due to phase shifting differs between positions on a main scanning line. Accordingly, if the above-described values of α are accumulated so that the position of a pixel to be subjected to phase shifting is too distant from its original position, the accuracy of scanning speed correction is reduced. Therefore, there is an upper limit value β to the amount of variation α of the initial value of the pixel clock counter. In FIG. 8, the upper limit value β is "3." That is, the position of the pixel region S is shifted less than three pixels from its default position (the position on a first line). In the case of FIG. 8, α is "1." Therefore, as illustrated in FIG. 8, the position of a "phase-shifted" pixel returns to its original position every time the position is shifted for two pixels, that is, every three lines.

Figure 9:
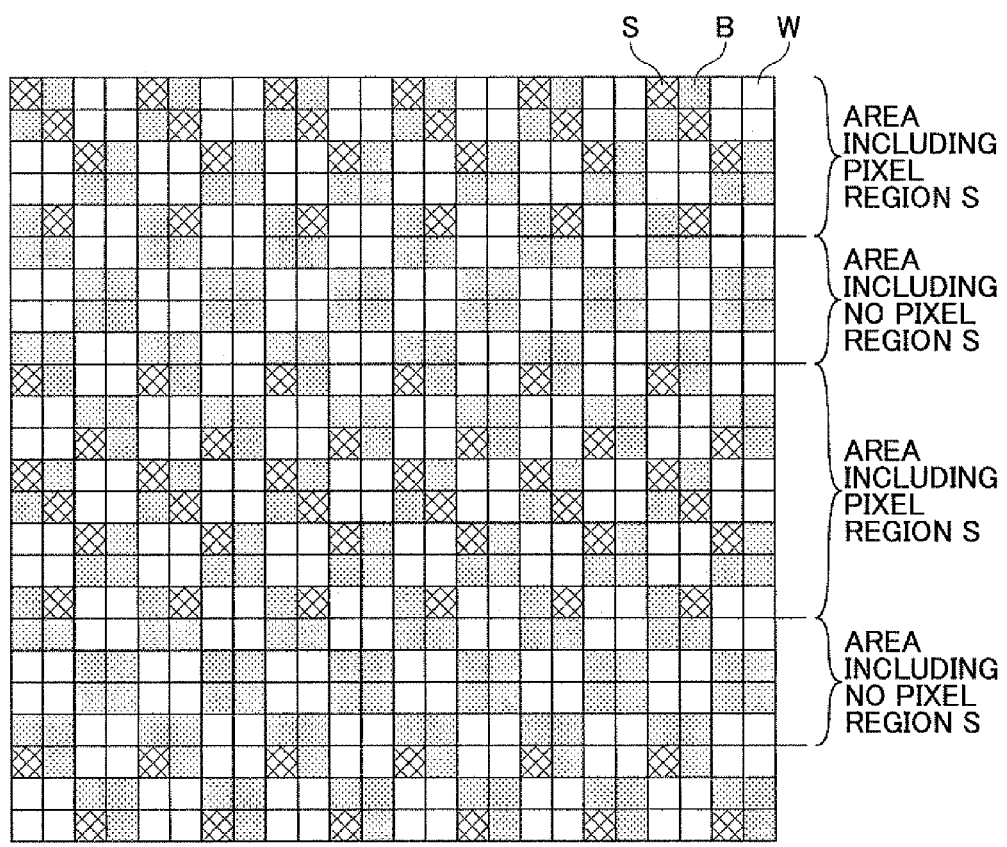
FIG. 9 is a diagram illustrating generation of moiré in phase shifting according to the first embodiment of the present invention.

As illustrated in FIG. 8, in a solid color image, the "phase-shifted" pixels are scattered with a substantially uniform density over the entire image, so that the "phase-shifted" pixels are hardly recognizable as image quality degradation to human vision. On the other hand, in the case of a dithered image, the "phase-shifted" pixels may appear as image quality degradation to human vision depending on the characteristic of dithering and the characteristic of phase shifting. FIG. 9 illustrates such a case.

FIG. 9 is a diagram illustrating the case of an image subjected to 2-by-2 dithering, that is, dithering where pixels with ink, that is, colored pixels, and pixels without ink, that is, colorless pixels, are alternated at intervals of two pixels in the main scanning direction and the sub scanning direction. In FIG. 9, in addition to the pixel region B and the pixel region S, there is a pixel region W, which is a region without ink. As illustrated in FIG. 9, addition of the pixel region W by 2-by-2 dithering turns some of the pixel region B and pixel region S pixels into the pixel regions W.

Since the pixel region W is an inkless region, there is no visual difference between a "phase-shifted pixel" and a pixel that is not subjected to phase shifting. On the other hand, as described above, the visual characteristic differs between the pixel region B and the pixel region S. Therefore, if the density of the pixel regions S, that is, the ratio of the number of pixel regions S, changes depending on a position in the image area, a change is caused in the visual characteristic of the entire image. In general, such a change in the visual characteristic is referred to as "misalignment" or "moiré." In the case of FIG. 9, "areas including the pixel region S" and "areas including no pixel region S" are alternated in the sub scanning direction. Accordingly, changes in image density appear as horizontal streaks in the image as a whole. This is caused by the relationship between the values of T1, α, and β described above, that is the mode of phase shifting, and 2 by 2, that is, the characteristic of dithering.

In order to avoid such "misalignment," the phase shifting part 122 according to this embodiment changes the mode of phase shifting by adjusting the values of α and β described above in accordance with the characteristic of dithering. The conditions to be satisfied by α and β according to this embodiment are illustrated below. The conditions to be satisfied by α and β are determined based on the relationship between the characteristic of dithering and T1. In this embodiment, a description is given of the case where D1, which is the period of dithering patterns in the main scanning direction (hereinafter referred to as "dithering period"), and T1 satisfy "D1=T1/n" (where n is a natural number).

In this case, the values of α and β are determined in accordance with the following equations (1) through (3):

$$D1 = \alpha D2, \quad (1)$$

$$D2 = \frac{\beta}{\alpha} \text{ (if } \beta/\alpha \text{ is an integer)}, \quad (2)$$

and $$D2 = \beta \text{ (if } \beta/\alpha \text{ is not an integer)}. \quad (3)$$

Here, in Eq. (1) through Eq. (3), "D2" is the period of dithering patterns in the sub scanning direction. Equation (1) is a conditional expression that determines that the angle formed by colored pixels or colorless pixels in dithering (hereinafter referred to as "dithering angle") and the angle formed by the pixel regions S in an image subjected to phase shifting ("phase-shifted" image) (hereinafter referred to as "phase shift angle"), that is α, match.

Further, Eqs. (2) and (3) are conditional expressions that determine that the period of dithering patterns in the sub scanning direction and the period of phase shifting in the sub scanning direction, T2, match. Here, the period of phase shifting in the sub scanning direction, T2, is "β/α" if an aliquot part of β is α, and is "β" if an aliquot part of β is not α.

In the case of FIG. 9, D1 and D2 are both "4." The phase shifting part 122 contains the above-described conditions of Eqs. (1) through (3), and determines the values of α and β based on the dithering information input from the dithering information obtaining part 123, that is, the values of D1 and D2. In the case of 2-by-2 dithering patterns as in FIG. 9, the phase shifting part 122 determines from Eq. (1) that α is 1, and as a result, determines from Eqs. (2) and (3) that β is 4.

Figure 10:
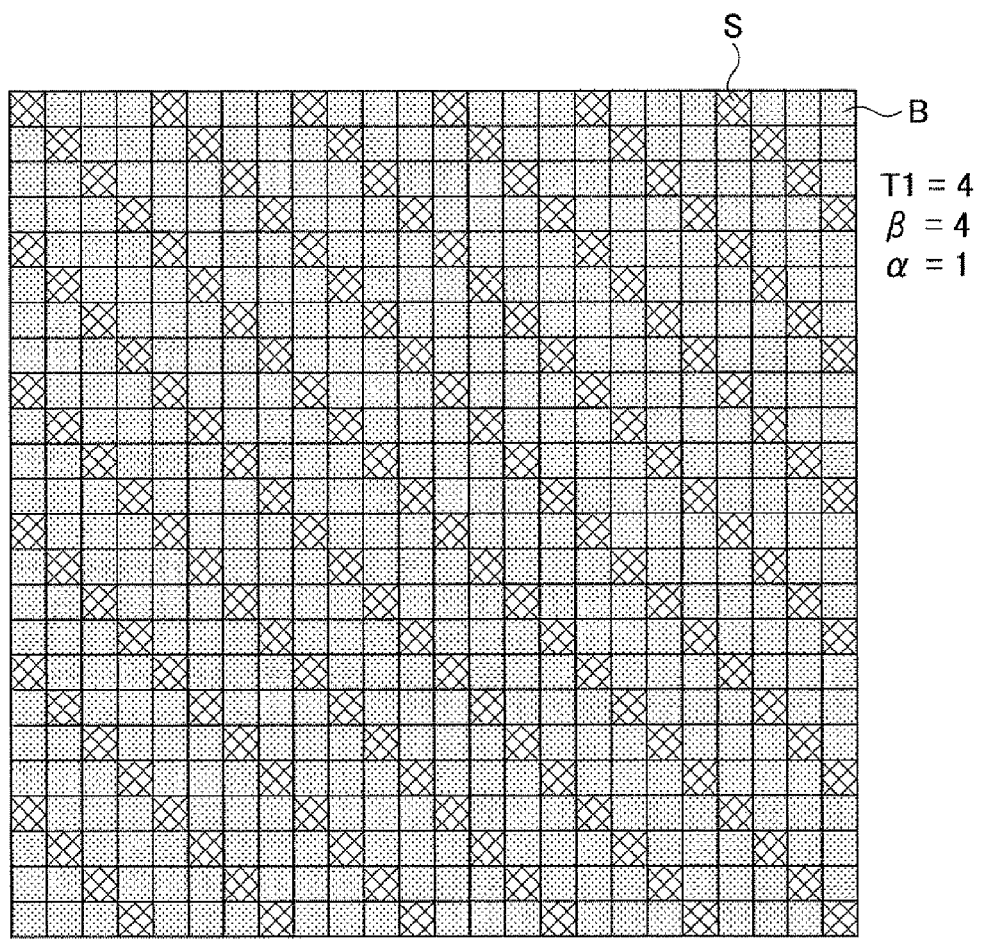
FIG. 10 is a diagram illustrating elimination of moiré in phase shifting according to the first embodiment of the present invention.
Figure 11:
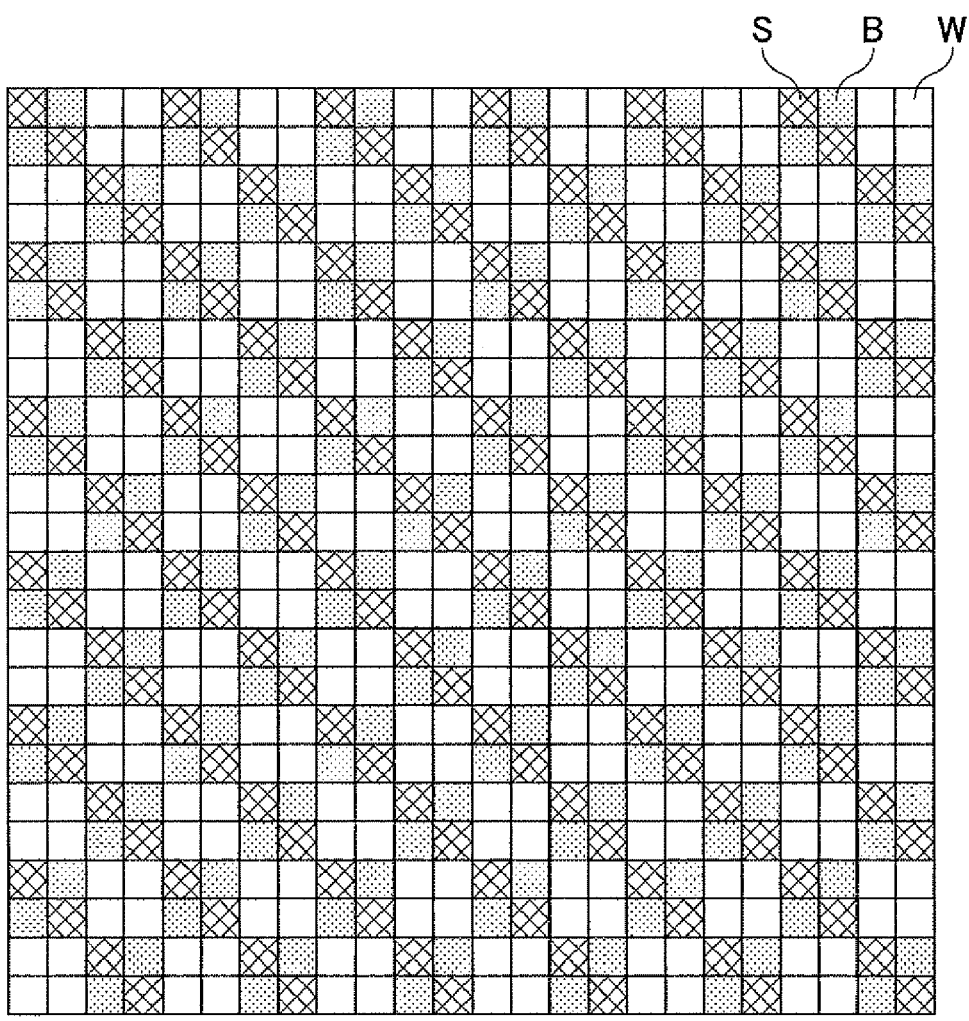
FIG. 11 is a diagram illustrating elimination of moiré in phase shifting according to the first embodiment of the present invention.

FIG. 10 and FIG. 11 illustrate images output as a result of having the values of α and β thus selected. FIG. 10 illustrates an image in the case of subjecting a solid color image to phase shifting as in FIG. 8 based on the values of α and β determined by the phase shifting part 122 as described above. As illustrated in FIG. 10, the pixel regions S, which are regions subjected to phase shifting, are scattered with a substantially uniform density over the entire image, and are therefore hardly recognizable as image quality degradation to human vision.

FIG. 11 illustrates an image in the case of subjecting a 2-by-2 dithered image to phase shifting as in FIG. 9 based on the values of α and β determined by the phase shifting part 122 as described above. FIG. 11 shows that as a result of the phase shifting based on the values of α and β determined by the phase shifting part 122, the pixel regions S are scattered with a substantially uniform density over the entire image so that no "misalignment" as in FIG. 9 occurs.

As described above, if the relationship of "D1=T1/n" (where n is a natural number) is satisfied, it is preferable that all of Eqs. (1) through (3) described above be satisfied. However, the condition of Eq. (1), that is, the condition that the dithering angle and the phase shift angle should match, may be omitted. In this case, a value predetermined based on the phase shift characteristic as illustrated with reference to FIG. 6 is used as the value of α. A description is given, with reference to FIG. 12 and FIG. 13, of such a case.

Figure 12:
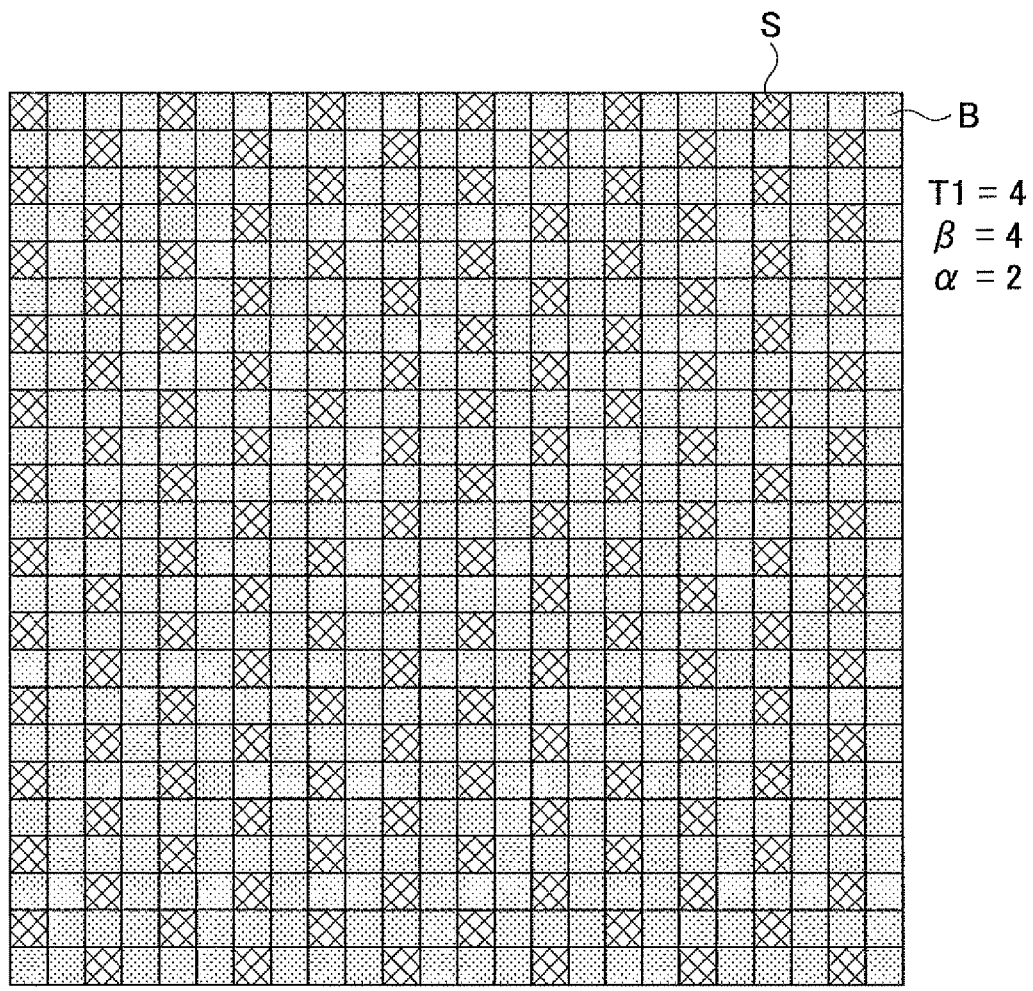
FIG. 12 is a diagram illustrating elimination of moiré in phase shifting according to the first embodiment of the present invention.

FIG. 12 illustrates an image in the case of subjecting a solid color image to phase shifting as in FIG. 8 based on the value of β determined by the phase shifting part 122. In the case of FIG. 12, the condition of Eq. (1) described above is omitted, and "2" as a value predetermined based on the phase shift characteristic is used as the value of α. As illustrated in FIG. 12, in the case of a solid color image, the pixel regions S are scattered with a substantially uniform density over the entire image, and are therefore hardly recognizable as image quality degradation to human vision.

Figure 13:
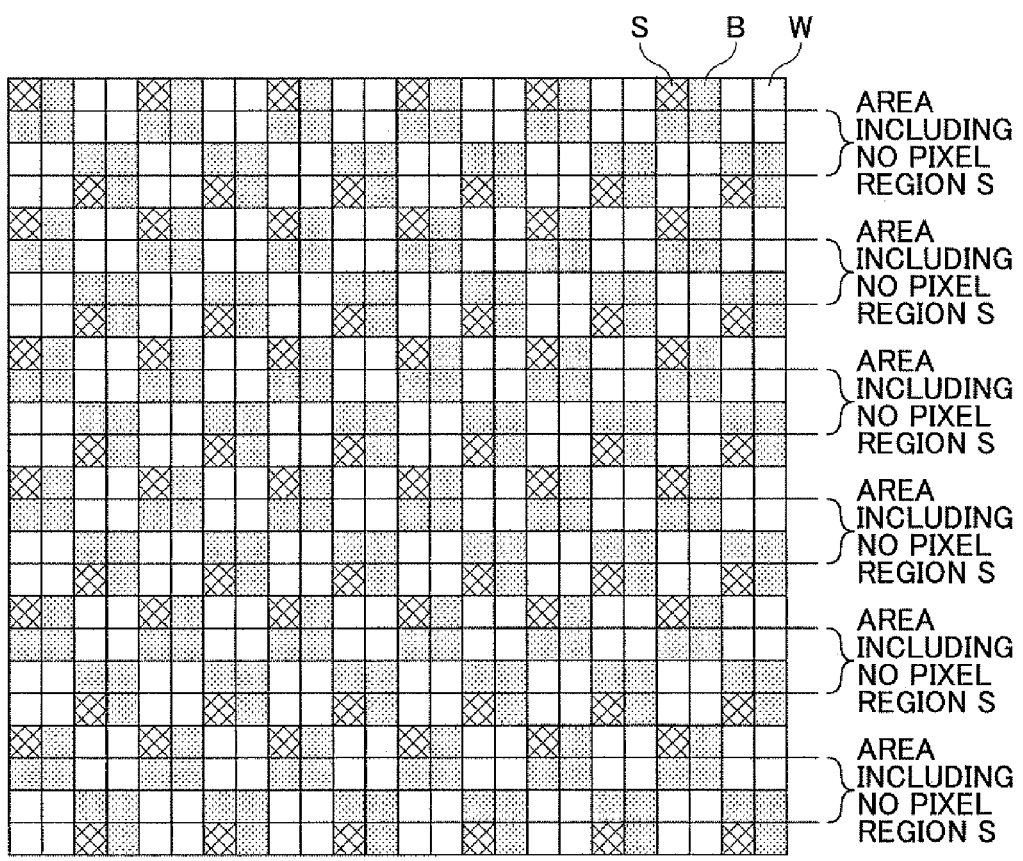
FIG. 13 is a diagram illustrating elimination of moiré in phase shifting according to the first embodiment of the present invention.

FIG. 13 illustrates an image in the case of subjecting a 2-by-2 dithered image as in FIG. 9 to the same phase shifting as in FIG. 12. In the cases of FIG. 12 and FIG. 13, "4" is selected as the value of β based on the condition of Eq. (2) described above. In this case, as illustrated in FIG. 13, areas including the pixel region S and areas including no pixel region S are alternately repeated with a period of four pixels in the sub scanning direction. This may be recognized as fine horizontal streaks. However, since the period is shorter than in the case of FIG. 9, the pixel regions S may be described as being scattered with a substantially uniform density over the entire image in a wider area view. Accordingly, it is possible to reduce "misalignment" even without the condition of Eq. (1) described above.

As described above, according to the optical writer 111 of this embodiment, when the dithering period and the phase shift period match in the main scanning direction, the dithering period and the phase shift period are caused to match in the sub scanning direction, and more preferably, the dithering angle and the phase shift angle are caused to match, thereby making it possible to avoid a greater degradation of image quality, such as moiré, based on the relationship between the characteristic of dithering and the characteristic of phase shifting.

In the above-described embodiment, a description is given of the case where the dithering information obtaining part 124 inputs the values of D1 and D2 to the phase shifting part 122 as dithering information. This is a mode corresponding to Eqs. (1) through (3) described above. That is, in the above-described embodiment, the phase shifting part 122 determines the values of α and β based on D1 and D2, and therefore, the information necessary for the phase shifting part 122 is D1 and D2. Accordingly, the dithering information obtaining part 124 inputs the values of D1 and D2 to the phase shifting part 122.

However, according to an aspect of the present invention, where the phase shifting part 122 modulates, based on the dithering information, a pixel clock pulse signal when the light emission part 121 controls the light source units 281, the information to which the phase shifting part 122 is to refer is not necessarily limited to the values of D1 and D2. Other examples of the dithering information referred to by the phase shifting part 122 may include information indicating the mode of dithering such as "2 by 2" as described above.

Further, FIG. 8 through FIG. 13 illustrate cases where T1, α, and β are constant over the entire image by way of example. However, the pixel regions are far greater in number in actual images than illustrated in FIG. 8 through FIG. 13. Further, as described above with reference to FIG. 6, a necessary (amount of) correction of the scanning speed differs from part to part in the main scanning direction in the image. Accordingly, the phase shifting part 122 preferably divides a main scanning line of the image into multiple blocks, and performs the above-described phase shift correction independently in each block (on a block basis). This makes it possible to accommodate a phase shift correction that varies from part to part in the main scanning direction as illustrated in FIG. 6.

Further, as understood from FIG. 6, the change in the necessary correction is sharp in some areas and moderate in other areas throughout in the main scanning direction. Accordingly, the phase shifting part 122 preferably divides the main scanning line in finer blocks in areas where the change in the necessary correction is sharp. In other words, the phase shifting part 122 changes the block size while keeping the condition of "T1=D1×n" so that the position shift characteristic keeps an ideal position, that is, the value of "0" in FIG. 6, in the position shift correction started from a first (starting) end in the main scanning direction, and arranges blocks up to a second (terminal) end in the main scanning direction.

Further, the mode of dithering may differ from part to part in the image. That is, the distribution characteristic of dithering may differ from part to part in the image. In other words, the values of D1 and D2 described above may differ depending on a position in the main scanning direction. On the other hand, since the phase shifting part 122 determines α and β based on the values of D1 and D2, the phase shifting part 122 is prevented from suitably determining the values of α and β if the distribution characteristic of dithering differs in a single block. By the phase shifting part 122 performing the above-described block dividing in accordance with the distribution characteristic of dithering, it is possible to perform phase shifting according to each mode of dithering.

Second Embodiment

In a second embodiment, a description is given of a case where the dithering period in the main scanning direction, D1, and the phase shift period in the main scanning direction, T1, satisfy a relationship of "D1=T1±n (where n is a natural number greater than or equal to two)," that is, the dithering period and the phase shift period in the main scanning direction are different and the difference is greater than or equal to two pixels.

In this case, the values of α and β are determined in accordance with the following equations (4) and (5):

$$D2 = \frac{\beta}{\alpha} \pm m \text{ (if } \beta/\alpha \text{ is an integer, } m \text{ is a natural number greater than or equal to two),} \tag{4}$$

and $$D2 = \beta \pm m \text{ (if } \beta/\alpha \text{ is not an integer; } m \text{ is a natural number greater than or equal to two).} \tag{5}$$

Equations (4) and (5) are conditional expressions that determine the dithering period in the sub scanning direction and the phase shift period in the sub scanning direction should not match and should differ by two pixels or more.

Figure 14:
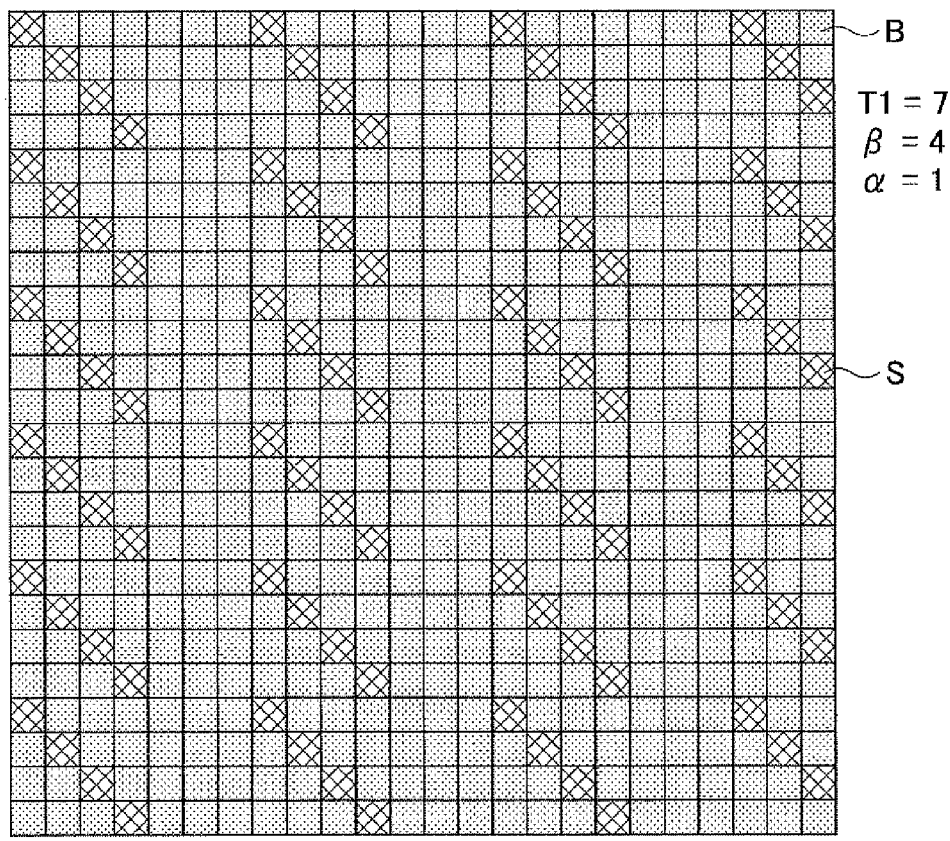
FIG. 14 is a diagram illustrating generation of moiré in phase shifting according to a second embodiment of the present invention.
Figure 15:
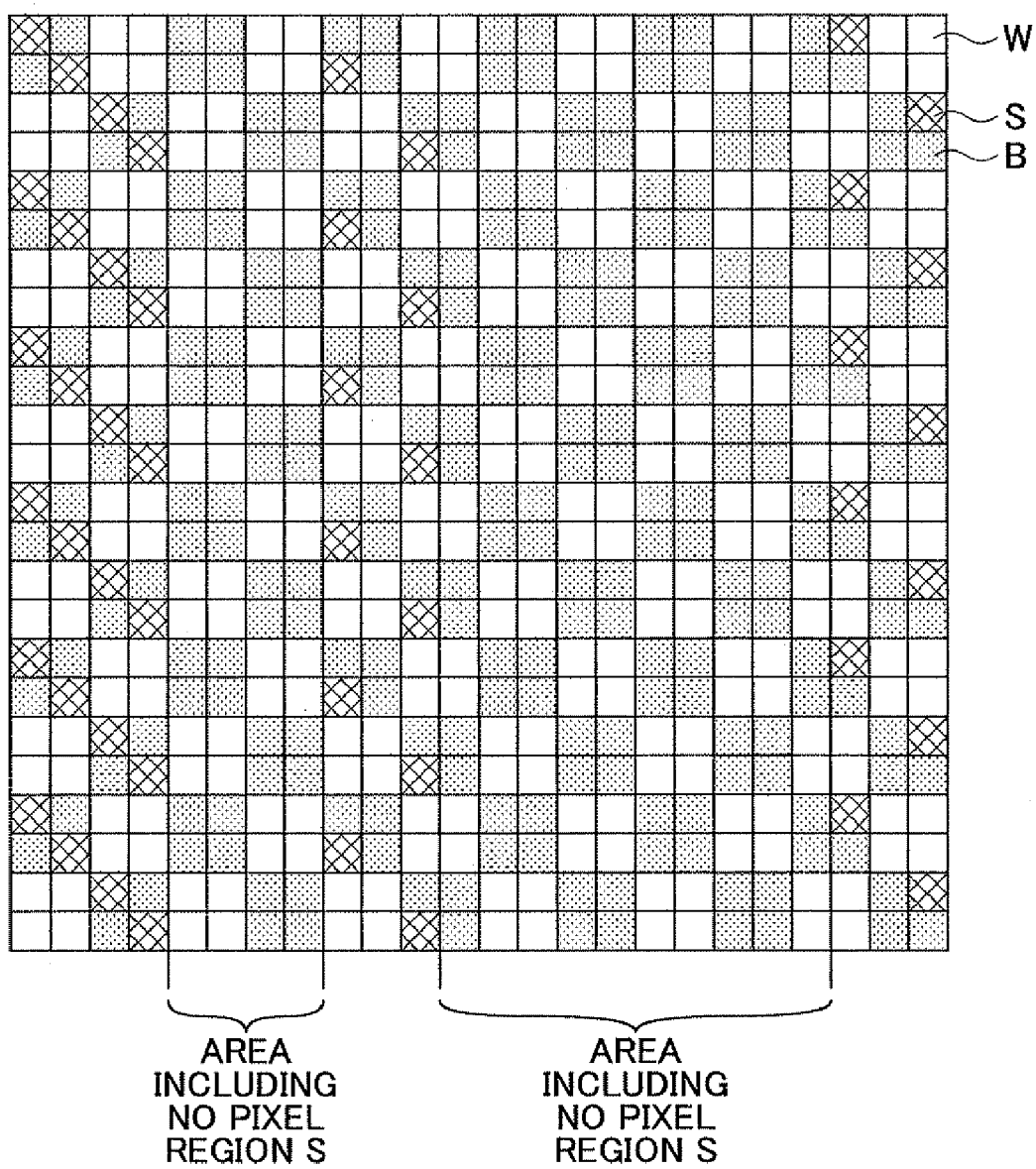
FIG. 15 is a diagram illustrating generation of moiré in phase shifting according to the second embodiment of the present invention.

FIG. 14 illustrates a solid color image in the case of the condition according to this embodiment. In the case of FIG. 14, the phase shift period in the main scanning direction, T1, is "7," that is, phase shifting is performed every seven pixels. Further, the default values of α and β are "1" and "4," respectively. FIG. 15 illustrates the image of FIG. 14 subjected to 2-by-2 dithering as in the first embodiment. In the case of FIG. 15, "an area including no pixel region S" repeatedly appears in the main scanning direction, so that changes in image density appear as vertical streaks over the entire image.

Next, a description is given of the case where the phase shifting part 122 adjusts the values of α and β in accordance with the conditions of Eqs. (4) and (5) described above. In the case of the image of FIG. 15, D2 is "4" and the default value of α is "1." Therefore, based on Eq. (5), the condition of "β=4±m (where m is a natural number greater than or equal to two)" is followed. Here, β is determined as "7."

One of the reasons for determining β as "7" in this embodiment is that the value of "β" is preferably as close to the value of T1 as possible. Here, the value of "β" indicates an upper limit to the number of pixels the position of the pixel region S shifts from its default position. For example, in the case of the image of FIG. 14, the value of "β" is smaller than T1 by "3." As a result, no pixel region S is potentially formed in the three pixels as illustrated in FIG. 14. Consequently, even in the case of a solid color image illustrated in FIG. 14, three-pixels' worth of vertical streaks is generated with a period of seven pixels. On the other hand, if the value of "β" is close to the value of T1, it is possible to prevent the above-described generation of areas where no pixel region S is potentially formed.

Figure 16:
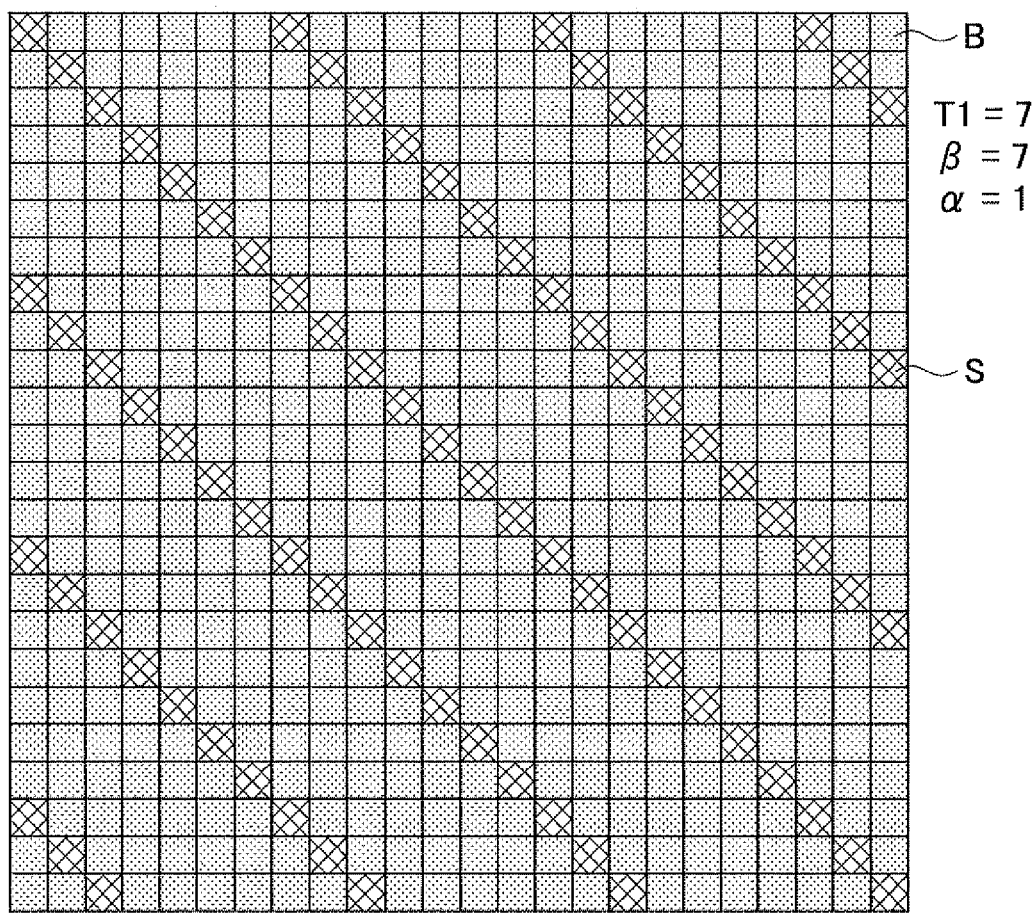
FIG. 16 is a diagram illustrating elimination of moiré in phase shifting according to the second embodiment of the present invention.
Figure 17:
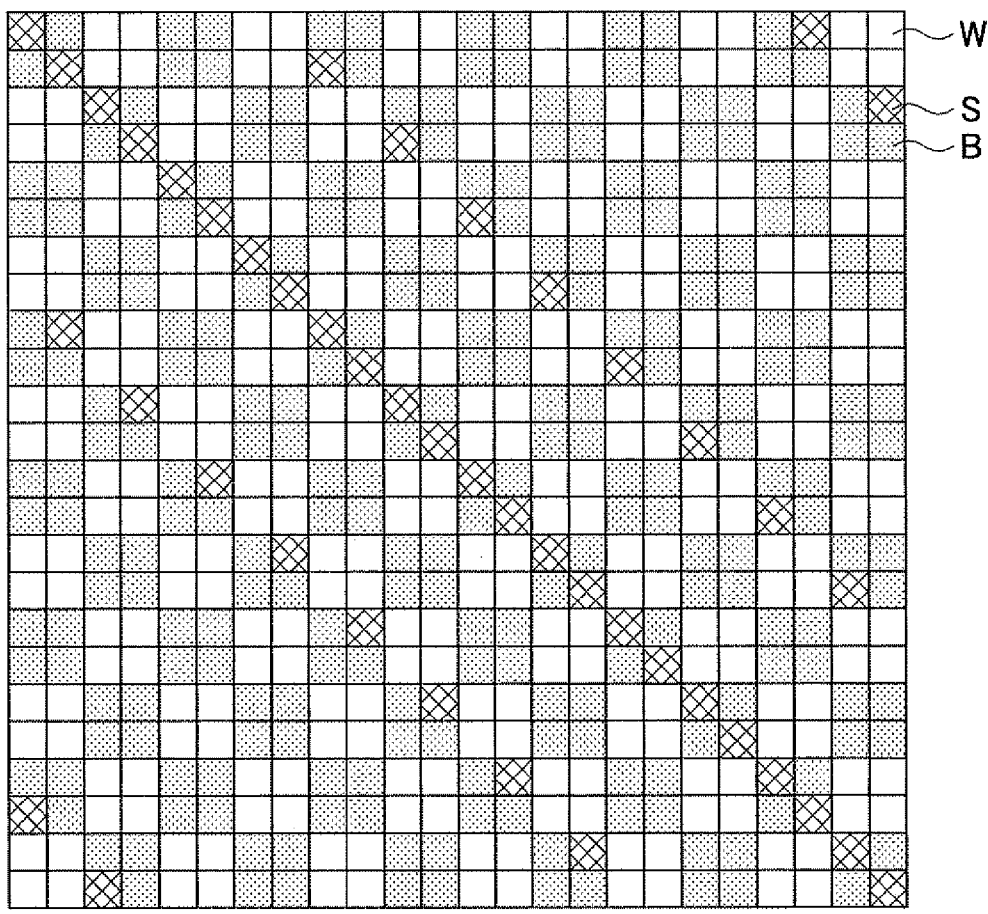
FIG. 17 is a diagram illustrating elimination of moiré in phase shifting according to the second embodiment of the present invention.

Next, FIG. 16 and FIG. 17 illustrate images in the case of determining β as "7" as described above. FIG. 16 illustrates an image in the case of subjecting a solid color image to phase shifting as in FIG. 14 but with β being "7." FIG. 17 illustrates an image in the case of having 2-by-2 dithering in the case of FIG. 16. In the case of FIG. 17, the vertical streaks as in FIG. 15 are eliminated, so that it is possible to confirm the effect of the processing by the phase shifting part 122.

Here, in the case of FIG. 17, the vertical streaks are eliminated as described above, but the pixel regions S are successively generated in an oblique direction, specifically from upper left to lower right, in the image. This pixel arrangement may be recognized as oblique streaks, and may be recognized as image quality degradation although the image quality is better than that of the image of FIG. 15.

This degradation of image quality may be eliminated by adding the condition of Eq. (6) below to the conditions of Eqs. (4) and (5) described above.

$$D1 \neq \alpha D2. \tag{6}$$

Equation (6), which corresponds to Eq. (1) in the first embodiment, is a conditional expression that determines that the dithering angle and the phase shift angle should not match.

In this embodiment, the dithering angle is "1" and α, which is the phase shift angle, is also "1." Therefore, the condition of Eq. (6) described above is not satisfied. Therefore, as described with reference to FIG. 17, light oblique streaks are generated. On the other hand, a description is given of the case where, for example, the phase shifting part 122 determines α as "2" in accordance with the condition of Eq. (6) described above.

Figure 18:
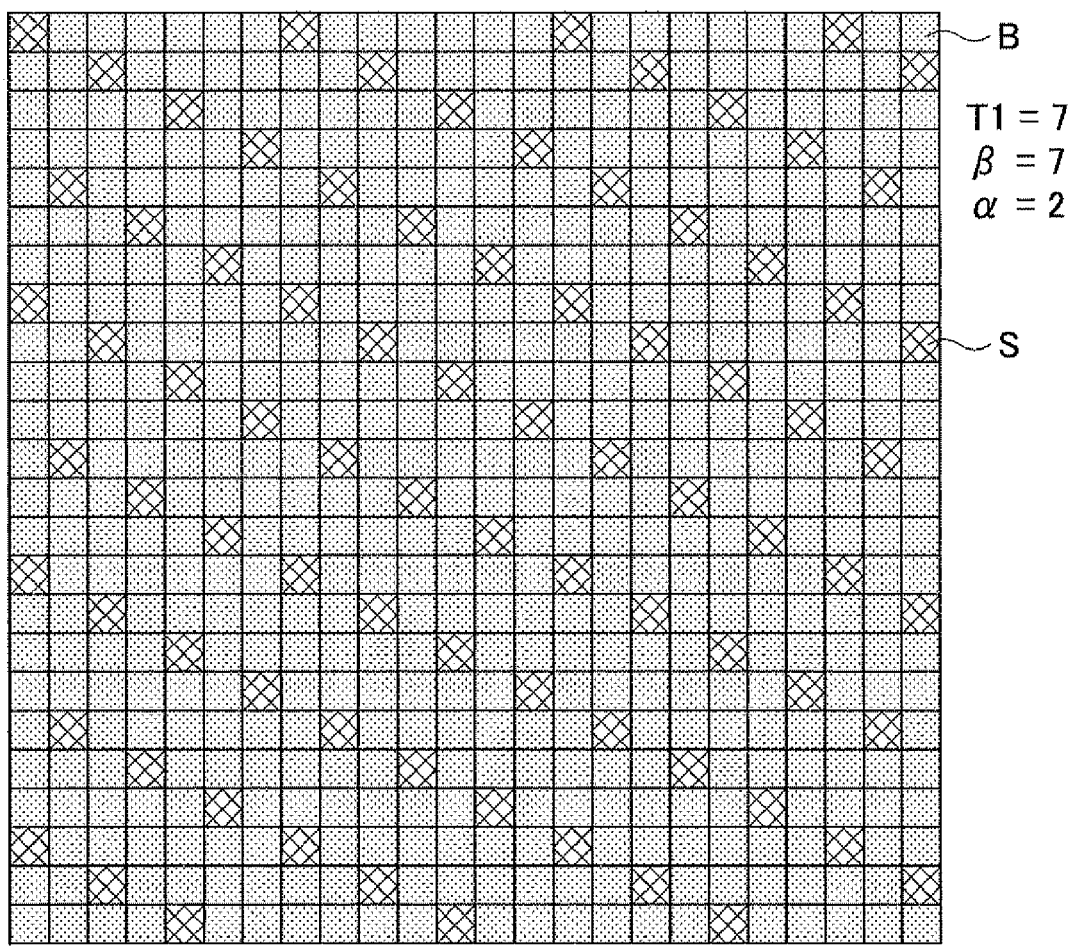
FIG. 18 is a diagram illustrating elimination of moiré in phase shifting according to the second embodiment of the present invention.
Figure 19:
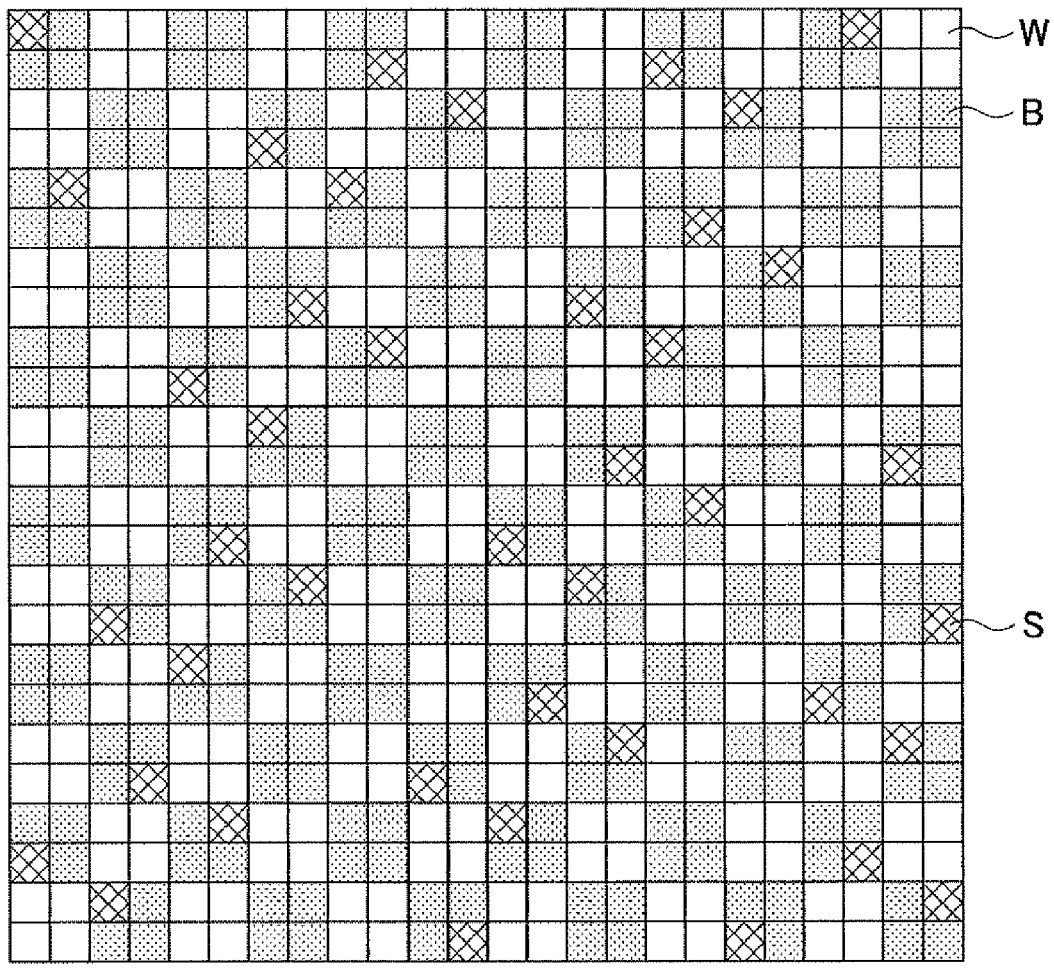
FIG. 19 is a diagram illustrating elimination of moiré in phase shifting according to the second embodiment of the present invention.

FIG. 18 illustrates an image in the case of subjecting a solid color image to phase shifting as in FIG. 16 but with β being "7" and α being "2." FIG. 19 illustrates an image in the case of having 2-by-2 dithering in the case of FIG. 18. In the case of FIG. 19, the pixel regions S are scattered over the entire image without generation of vertical streaks as in FIG. 15. Further, the oblique streaks as in FIG. 17 are eliminated. Thus, it is possible to confirm the effect of the processing based on the condition of Eq. (6) as well as those of Eqs. (4) and (5) by the phase shifting part 122

As described above, according to the optical writer 111 of this embodiment, if the dithering period and the phase shift period in the main scanning direction are different and the difference is more than or equal to two pixels, the dithering period and the phase shift period in the sub scanning direction are caused to differ by two or more pixels, and more preferably, the dithering angle and the phase shift angle are caused to differ, thereby making it possible to avoid a greater degradation of image quality, such as moiré, based on the relationship between the characteristic of dithering and the characteristic of phase shifting.

As described above, the dithering angle and the phase shift angle may match. In this case, oblique streaks may be generated as in FIG. 17. However, due to the characteristics of electrophotography, such oblique streaks are less likely to be visually recognized as a great change unless the pixel regions S are successive in a horizontal direction or a vertical direction, that is, the main scanning direction or the sub scanning direction. Therefore, even in the state of FIG. 17, the image quality is improved.

Third Embodiment

In a third embodiment, a description is given of a case where the dithering period in the main scanning direction, D1, and the phase shift period in the main scanning direction, T1, satisfy a relationship of "D1=T1±1," that is, the dithering period and the phase shift period in the main scanning direction are different and the difference is one pixel.

Figure 20:
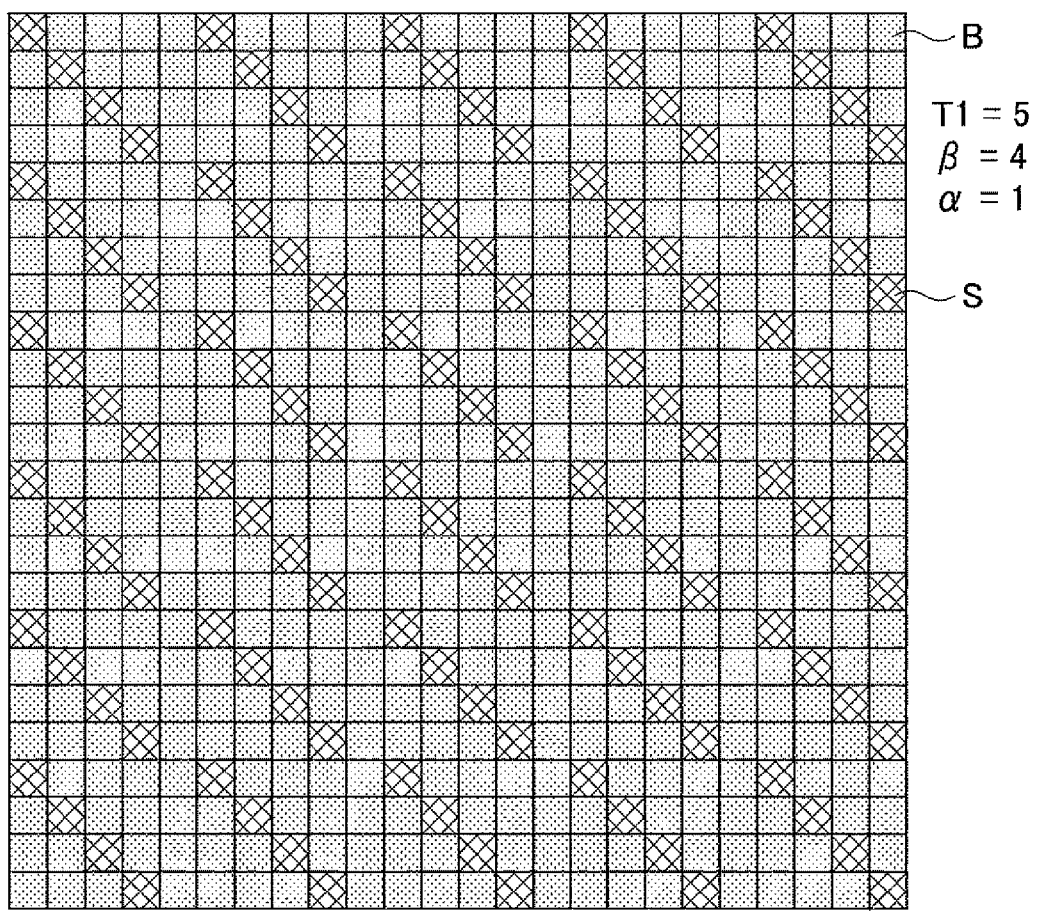
FIG. 20 is a diagram illustrating generation of moiré in phase shifting according to a third embodiment of the present invention.
Figure 21:
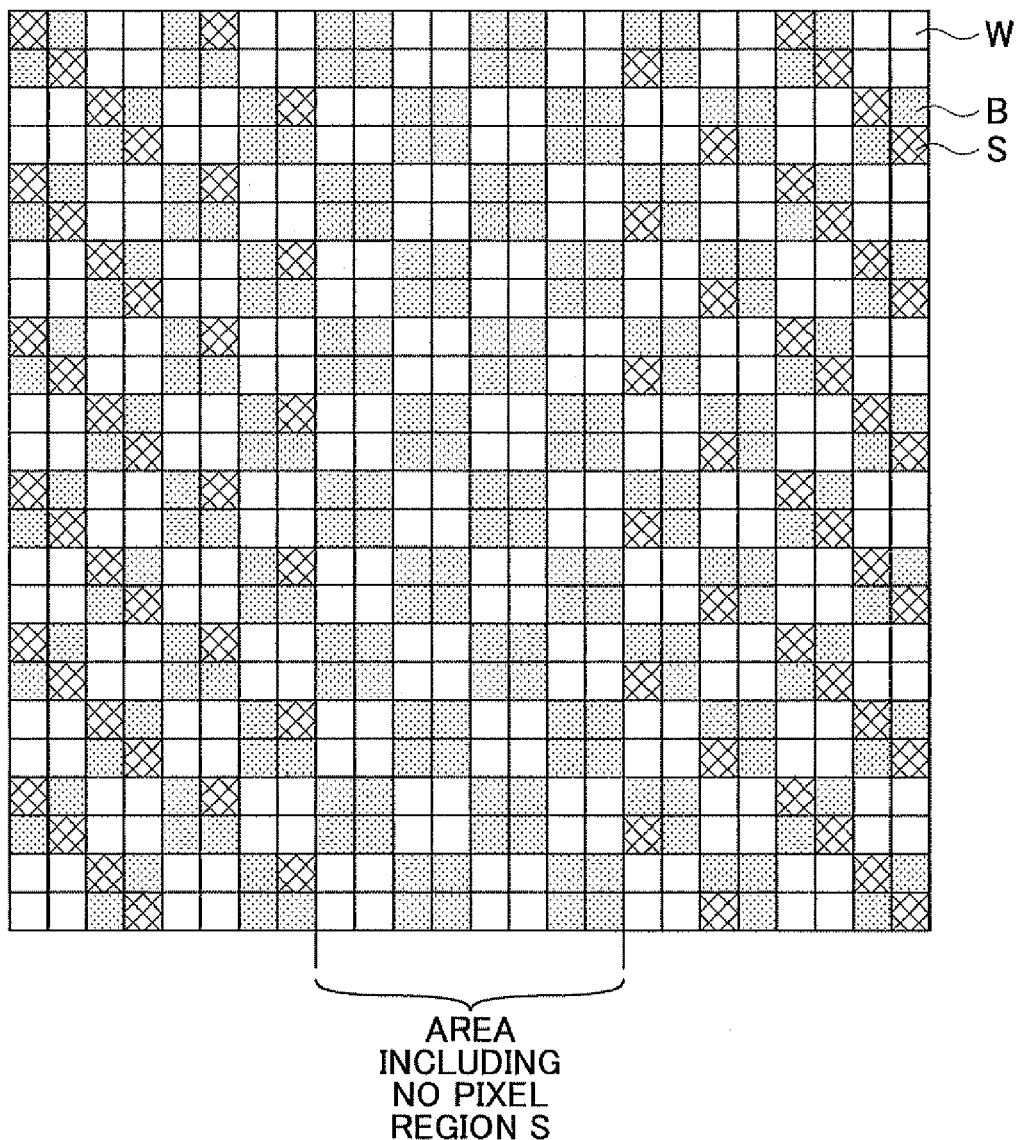
FIG. 21 is a diagram illustrating generation of moiré in phase shifting according to the third embodiment of the present invention.

In this embodiment as well, the values of $\alpha$ and $\beta$ are determined in accordance with Eqs. (4) and (5) the same as in the second embodiment. FIG. 20 illustrates a solid color image in the case of the condition according to this embodiment. In the case of FIG. 20, the phase shift period in the main scanning direction, T1, is "5," that is, phase shifting is performed every five pixels. Further, the default values of $\alpha$ and $\beta$ are "1" and "4," respectively. FIG. 21 illustrates the image of FIG. 20 subjected to 2-by-2 dithering as in the first embodiment.

In the case of FIG. 21, "an area including no pixel region S" appears as a vertical streak. In a larger image, this "area including no pixel region S" repeatedly appears in the main scanning direction so that changes in image density appear as vertical streaks over the entire image. Next, a description is given of the case where the phase shifting part 122 adjusts the values of $\alpha$ and $\beta$ in accordance with the conditions of Eqs. (4) and (5) described above.

In the case of the image of FIG. 21, D2 is "4" and the default value of $\alpha$ is "1." Therefore, based on Eq. (5), the condition of "$\beta=4\pm m$ (where m is a natural number greater than or equal to two)" is followed. Here, $\beta$ is determined as "6." The reason for determining $\beta$ as "6" in this embodiment is as described in the second embodiment.

Figure 22:
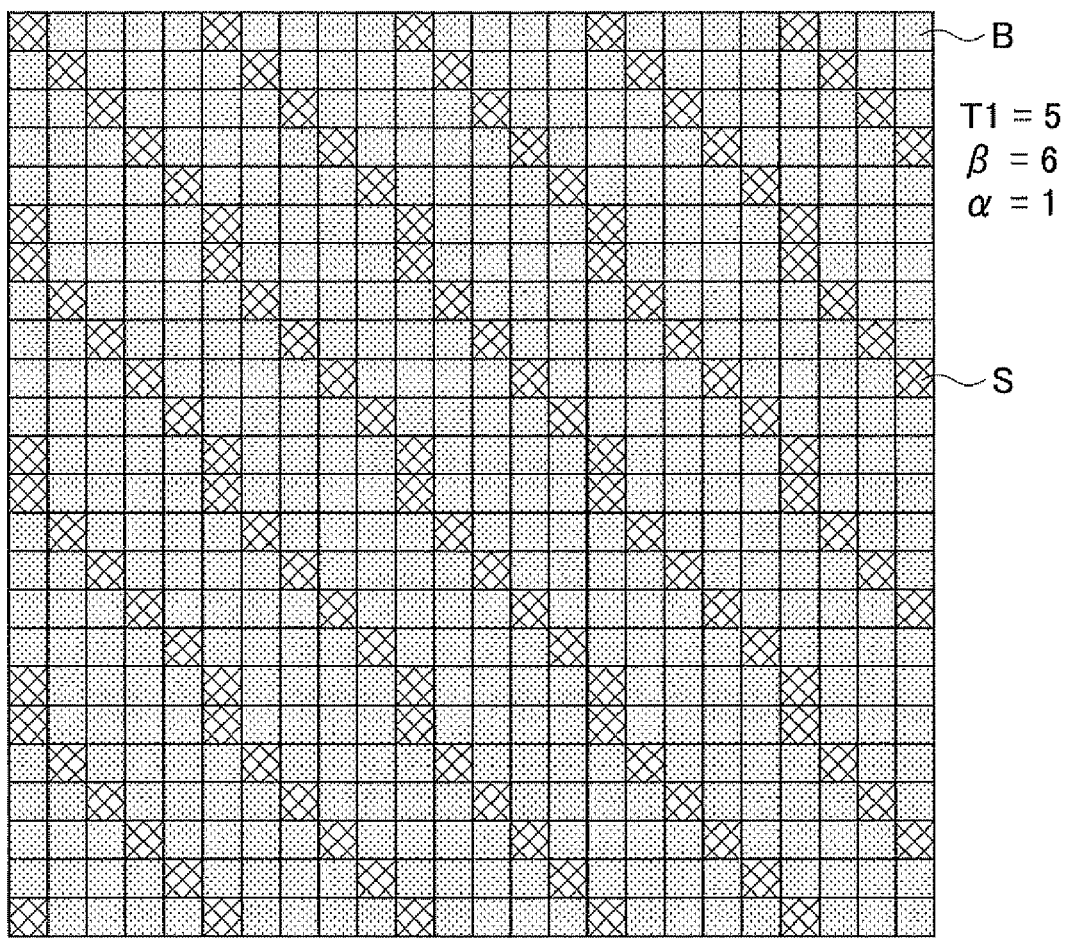
FIG. 22 is a diagram illustrating elimination of moiré in phase shifting according to the third embodiment of the present invention.
Figure 23:
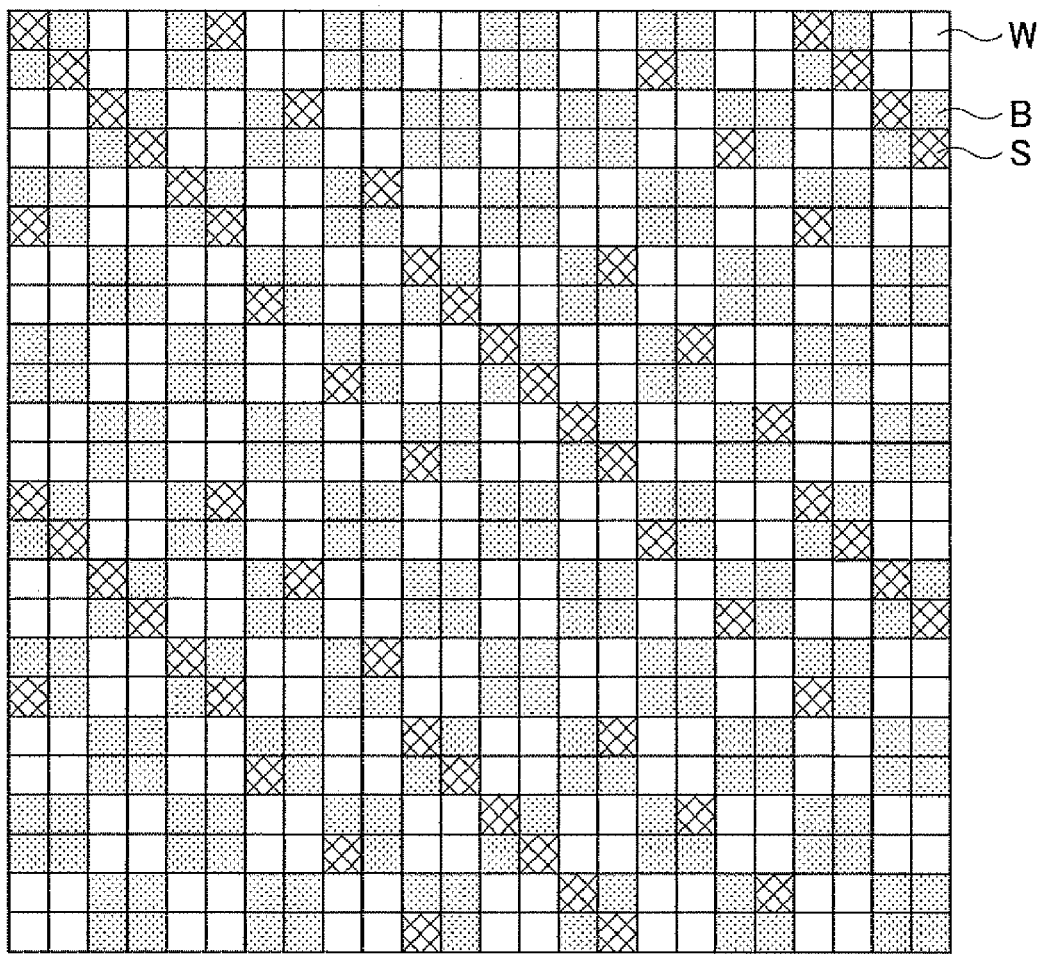
FIG. 23 is a diagram illustrating elimination of moiré in phase shifting according to the third embodiment of the present invention.

Next, FIG. 22 and FIG. 23 illustrate images in the case of determining $\beta$ as "6" as described above. FIG. 22 illustrates an image in the case of subjecting a solid color image to phase shifting as in FIG. 20 but with $\beta$ being "6." FIG. 23 illustrates an image in the case of having 2-by-2 dithering in the case of FIG. 22. In the case of FIG. 23, the vertical streak as in FIG. 21 is eliminated, so that it is possible to confirm the effect of the processing by the phase shifting part 122.

However, in the case of FIG. 23 as well, faint oblique streaks may be recognized the same as in the case of FIG. 17 in the second embodiment. On the other hand, it is possible to further improve the image quality by determining the value of $\alpha$ with the addition of the condition of Eq. (6) described above. Here, a description is given below of the case where the phase shifting part 122 determines $\alpha$ as "3" in accordance with the condition of Eq. (6) described above.

Figure 24:
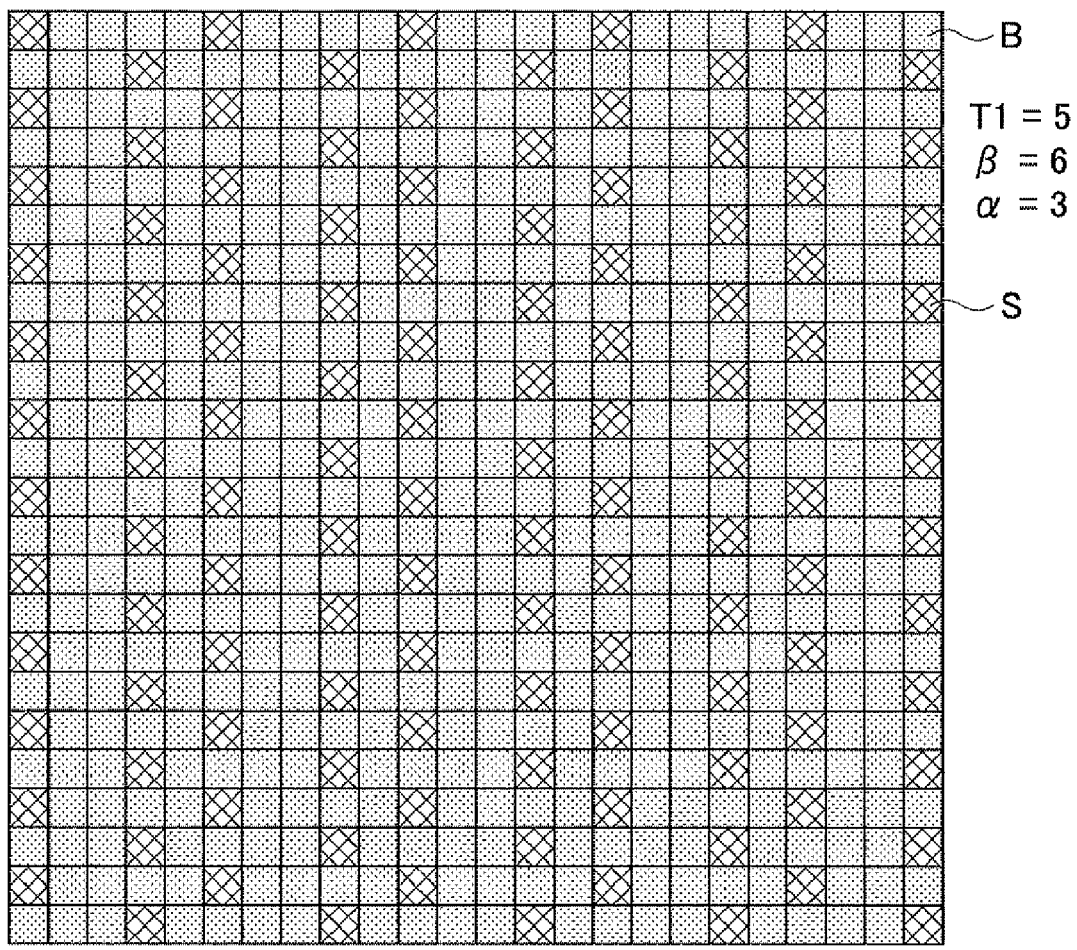
FIG. 24 is a diagram illustrating elimination of moiré in phase shifting according to the third embodiment of the present invention.
Figure 25:
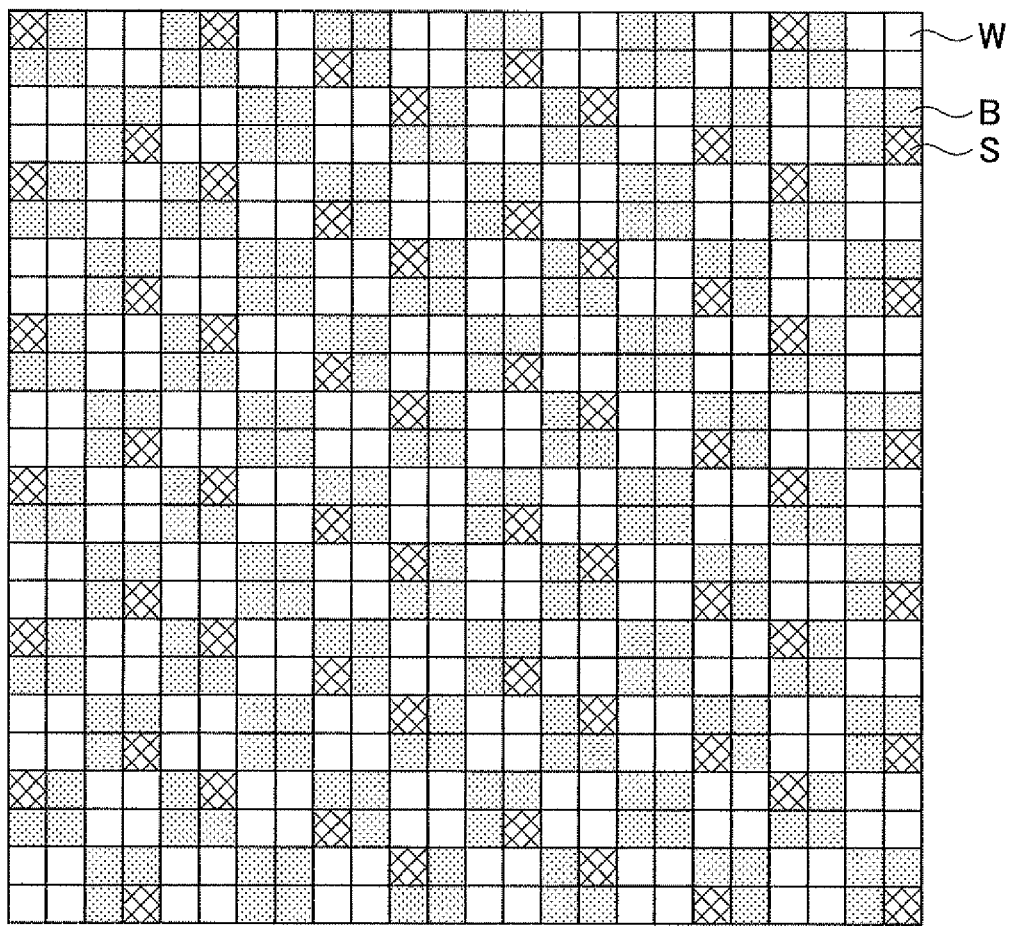
FIG. 25 is a diagram illustrating elimination of moiré in phase shifting according to the third embodiment of the present invention.

FIG. 24 illustrates an image in the case of subjecting a solid color image to phase shifting as in FIG. 22 but with $\beta$ being "6" and $\alpha$ being "3." FIG. 25 illustrates an image in the case of having 2-by-2 dithering in the case of FIG. 24. In the case of FIG. 25, the pixel regions S are scattered over the entire image without generation of a vertical streak as in FIG. 21. Further, the oblique streaks as in FIG. 23 are eliminated. Thus, it is possible to confirm the effect of the processing based on the condition of Eq. (6) as well as those of Eqs. (4) and (5) by the phase shifting part 122

As described above, according to the optical writer 111 of this embodiment, if the dithering period and the phase shift period in the main scanning direction are different and the difference is one pixel, the dithering period and the phase shift period in the sub scanning direction are caused to differ by two or more pixels, and more preferably, the dithering angle and the phase shift angle are caused to differ, thereby making it possible to avoid a greater degradation of image quality, such as moiré, based on the relationship between the characteristic of dithering and the characteristic of phase shifting.

One of the reasons for determining $\alpha$ as "3" in the cases of FIG. 24 and FIG. 25 is that the angle of the pixel regions S from the upper right to lower left of the image is also considered in addition to the angle of the pixel regions S from the upper left to lower right of the image. In the case of 2-by-2 dithering, the angle from upper left to lower right and the angle from upper right to lower left are both "1" with respect to the dithering angle. Accordingly, it is preferable to consider both of the above-described angles with respect to the angle of the pixel regions S as well.

For example, in the case of FIG. 24, if $\alpha$ is "4," the angle from the upper right to lower left of the image is "1," which matches the dithering angle. As a result, the distribution of the pixel regions S is biased, so that the image quality may be reduced. Accordingly, in determining the value of $\alpha$, the phase shifting part 122 preferably considers the angle of the pixel regions S from the upper right to lower left of the image in addition to the angle of the pixel regions S from the upper left to lower right of the image. The angle of the pixel regions S from the upper right to lower left of the image may be expressed by, for example, "$(T1-\alpha)$." By causing the value of this equation and the dithering angle to be different, it is possible to prevent the distribution of the pixel regions S from being biased.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. An optical writer configured to form an electrostatic latent image on a photosensitive body by emitting a light beam onto the photosensitive body, the optical writer comprising:

a light source configured to emit the light beam;

a scanning part configured to guide the emitted light beam onto the photosensitive body and cause the light beam to perform scanning thereon;

an image information obtaining part configured to obtain image information of an image to be formed as the electrostatic latent image;

a dithering information obtaining part configured to obtain dithering information of dithering of the image;

a pixel clock generating part configured to generate a pixel clock signal; and a light emission control part configured to control the light source based on the obtained image information in accordance with the generated pixel clock signal so as to cause the light source to emit the light beam, wherein the pixel clock generating part is configured to modulate a clock frequency of the pixel clock signal in accordance with phase shift information for correcting a change in a speed of the scanning by the light beam on main scanning lines on the photosensitive body, and to determine a timing of modulating the clock frequency based on the obtained dithering information on a main scanning line basis so that the timing of modulating the clock frequency differs between the main scanning lines.

2. The optical writer as claimed in claim 1, wherein the pixel clock generating part is configured to determine the timing of modulating the clock frequency so that a sub scanning modulation period and a period of the dithering in a sub scanning direction match, the sub scanning modulation period being a period of the timing of modulating the clock frequency on a sub scanning line, if a main scanning modulation period and a period of the dithering in a main scanning direction match, the main scanning modulation period being a period of the timing of modulating the clock frequency in one of the main scanning lines.

3. The optical writer as claimed in claim 2, wherein the pixel clock generating part is configured to determine the timing of modulating the clock frequency so that an angle formed by colored pixels or colorless pixels on the image in the dithering and an angle formed by pixels of the modulated clock frequency match, if the main scanning modulation period and the period of the dithering in the main scanning direction match.

4. The optical writer as claimed in claim 2, wherein the pixel clock generating part is configured to shift the timing of modulating the clock frequency by a predetermined number of pixels α for each of the main scanning lines, and to return the timing to an initial value in response to a number of pixels the timing of modulating the clock frequency has been shifted reaching a predetermined upper limit value β, and the pixel clock generating part is configured to determine the timing of modulating the clock frequency by determining values of said α and said β so that, with respect to the period of the dithering in the sub scanning direction, an equation $$D2 = \frac{\beta}{\alpha}$$

holds if β/α is an integer and an equation D2=β holds if β/α is not an integer, where D2 is the period of the dithering in the sub scanning direction, if the main scanning modulation period and the period of the dithering in the main scanning direction match.

5. The optical writer as claimed in claim 4, wherein the pixel clock generating part is configured to determine the timing of modulating the clock frequency by determining the value of said α so that, with respect to the period of the dithering in the main scanning direction, a relationship of D1=αD2 holds, where D1 is the period of the dithering in the main scanning direction, if the main scanning modulation period and the period of the dithering in the main scanning direction match.

6. The optical writer as claimed in claim 1, wherein the pixel clock generating part is configured to determine the timing of modulating the clock frequency so that a sub scanning modulation period and a period of the dithering in a sub scanning direction are different, the sub scanning modulation period being a period of the timing of modulating the clock frequency on a sub scanning line, if a main scanning modulation period and a period of the dithering in a main scanning direction are different, the main scanning modulation period being a period of the timing of modulating the clock frequency in one of the main scanning lines.

7. The optical writer as claimed in claim 6, wherein the pixel clock generating part is configured to determine the timing of modulating the clock frequency so that an angle formed by colored pixels or colorless pixels on the image in the dithering and an angle formed by pixels of the modulated clock frequency are different, if the main scanning modulation period and the period of the dithering in the main scanning direction are different.

8. The optical writer as claimed in claim 6, wherein the pixel clock generating part is configured to shift the timing of modulating the clock frequency by a predetermined number of pixels α for each of the main scanning lines, and to return the timing to an initial value in response to a number of pixels the timing of modulating the clock frequency has been shifted reaching a predetermined upper limit value β, and the pixel clock generating part is configured to determine the timing of modulating the clock frequency by determining values of said α and said β so that, with respect to the period of the dithering in the sub scanning direction, an equation $$D2 = \frac{\beta}{\alpha} \pm m$$

holds if β/α is an integer and an equation D2=β±m holds if β/α is not an integer, where D2 is the period of the dithering in the sub scanning direction and m is a natural number greater than or equal to two, if the main scanning modulation period and the period of the dithering in the main scanning direction are different.

9. The optical writer as claimed in claim 8, wherein the pixel clock generating part is configured to determine the timing of modulating the clock frequency by determining the value of said α so that, with respect to the period of the dithering in the main scanning direction, a relationship of D1≠αD2 holds, where D1 is the period of the dithering in the main scanning direction, if the main scanning modulation period and the period of the dithering in the main scanning direction are different.

10. The optical writer as claimed in claim 9, wherein the pixel clock generating part is configured to divide each of the main scanning lines into a plurality of blocks, and to modulate the clock frequency with a predetermined pixel period on a block basis, and the pixel clock generating part is configured to determine the timing of modulating the clock frequency on the block basis.

11. The optical writer as claimed in claim 9, wherein the pixel clock generating part is configured to change a number of pixels on the block basis in dividing each of the main scanning lines into the blocks, in accordance with a distribution characteristic of the dithering of the image based on the obtained dithering information.

12. An image forming apparatus, comprising:
the optical writer as set forth in claim 1.

13. A method of controlling an optical writer configured to form an electrostatic latent image on a photosensitive body by emitting a light beam onto the photosensitive body, the method comprising:

emitting the light beam from a light source;

guiding the emitted light beam onto the photosensitive body and causing the light beam to perform scanning thereon with a scanning part;

obtain image information of an image to be formed as the electrostatic latent image by an image information obtaining part;

obtaining dithering information of dithering of the image by a dithering information obtaining part;

generating a pixel clock signal by a pixel clock generating part;

controlling the light source based on the obtained image information in accordance with the generated pixel clock signal so as to cause the light source to emit the light beam by a light emission control part;

modulating, by the pixel clock generating part, a clock frequency of the pixel clock signal in accordance with phase shift information for correcting a change in a speed of the scanning by the light beam on main scanning lines on the photosensitive body; and determining, by the pixel clock generating part, a timing of modulating the clock frequency based on the obtained dithering information on a main scanning line basis so that the timing of modulating the clock frequency differs between the main scanning lines.

* * * * *